(12) United States Patent
Wentink et al.

(10) Patent No.: US 9,197,299 B2
(45) Date of Patent: Nov. 24, 2015

(54) SYSTEMS AND METHODS FOR APPLYING MULTI-SOURCE MULTIPLE-INPUT MULTIPLE-OUTPUT COMMUNICATIONS

(71) Applicant: QUALCOMM Incorporated, San Diego, CA (US)

(72) Inventors: Maarten Menzo Wentink, Naarden (NL); Didier Johannes Richard Van Nee, De Meern (NL)

(73) Assignee: QUALCOMM Incorporated, San Diego, CA (US)

(*) Notice: Subject to any disclaimer, the term of this patent is extended or adjusted under 35 U.S.C. 154(b) by 77 days.

(21) Appl. No.: 13/773,367

(22) Filed: Feb. 21, 2013

(65) Prior Publication Data

US 2013/0223343 A1   Aug. 29, 2013

Related U.S. Application Data

(60) Provisional application No. 61/602,268, filed on Feb. 23, 2012.

(51) Int. Cl.
| H04L 12/28 | (2006.01) |
| H04B 7/04 | (2006.01) |
| H04B 7/02 | (2006.01) |
| H04J 1/16 | (2006.01) |
| H04W 92/20 | (2009.01) |

(52) U.S. Cl.
CPC .............. *H04B 7/0452* (2013.01); *H04B 7/024* (2013.01); *H04W 92/20* (2013.01)

(58) Field of Classification Search
CPC .............................. H04B 7/024; H04B 7/0452
USPC ................... 370/252, 329, 389, 386
See application file for complete search history.

(56) References Cited

U.S. PATENT DOCUMENTS

| 7,885,235 | B2 | 2/2011 | Mochizuki et al. | |
| 8,665,949 | B1* | 3/2014 | Zhang et al. | 375/240.1 |
| 2008/0207278 | A1* | 8/2008 | Qi et al. | 455/574 |
| 2009/0175214 | A1* | 7/2009 | Sfar | H04B 7/15592 370/315 |
| 2009/0196212 | A1* | 8/2009 | Wentink | 370/311 |
| 2011/0110351 | A1* | 5/2011 | Seok | 370/338 |
| 2011/0110403 | A1* | 5/2011 | Jongren | 375/219 |
| 2011/0255625 | A1 | 10/2011 | Song et al. | |
| 2011/0268007 | A1 | 11/2011 | Barany et al. | |
| 2011/0286408 | A1* | 11/2011 | Flore et al. | 370/329 |
| 2011/0287798 | A1 | 11/2011 | Ono et al. | |
| 2011/0305195 | A1 | 12/2011 | Forck et al. | |

(Continued)

OTHER PUBLICATIONS

3GPP TSG RAN WG1 Meeting #56, "Discussion on Information Exchange Aspects of DL CoMP" R1-090686, Athens, Greece, Feb. 9-13, 2009.

(Continued)

*Primary Examiner* — John Pezzlo
(74) *Attorney, Agent, or Firm* — Austin Rapp & Hardman

(57) ABSTRACT

A method for applying multi-source multiple-input multiple-output communications by a base station is described. The method includes obtaining data for transmission to a wireless communication device. The method also includes sending a second portion of the data to an assisting base station. The method also includes sending an indication frame that comprises an identifier of the wireless communication device to the assisting base station. The method also includes transmitting a first portion of the data on a first set of spatial streams.

47 Claims, 15 Drawing Sheets

(56) References Cited

U.S. PATENT DOCUMENTS

| | | | |
|---|---|---|---|
| 2011/0319092 A1* | 12/2011 | Kim et al. | 455/452.1 |
| 2012/0002741 A1* | 1/2012 | Wang et al. | 375/260 |
| 2012/0033624 A1* | 2/2012 | Luo et al. | 370/329 |
| 2012/0140689 A1* | 6/2012 | Pelletier | H04W 76/048 370/311 |
| 2012/0230691 A1* | 9/2012 | Hui et al. | 398/58 |
| 2013/0034136 A1* | 2/2013 | Park et al. | 375/219 |
| 2013/0089159 A1* | 4/2013 | Liu | 375/267 |
| 2014/0070996 A1* | 3/2014 | Kneckt et al. | 342/386 |

OTHER PUBLICATIONS

International Search Report and Written Opinion—PCT/US2013/027293—ISA/EPO—Jun. 4, 2013.

Marsch, et al., "On Base Cooperation Schemes for Downlink Network MIMO under a Constrained Backhaul," 2008 IEEE Global Telecommuications Conference, pp. 1-6.

Tokyo Institute of Technology: "Distributed CoMP for LTE-Advanced", 3GPP Draft; R1-093081 Distributed Dynamic CoMP for LTE Advanced, 3rd Generation Partnership Project (3GPP), Mobile Competence Centre; 650 Route Des Lucioles; F-06291 Sophia-Antipolis Cedex; France, no. Shenzhen, China; Aug. 18, 2009, XP050351467.

ZTE: "Discussion on Feedback Aspects of DL CoMP", Draft; R1-091438 Discussion on Feedback Aspects of DL CoMP, 3rd Generation Partnership Project (3GPP), Mobile Competence Centre; 650, Route Des Lucioles; F-06921 Sophia-Antipolis Cedex; France, no. Seoul, Korea; Mar. 17, 2009, XP050339013.

* cited by examiner

SYSTEMS AND METHODS FOR APPLYING MULTI-SOURCE MULTIPLE-INPUT MULTIPLE-OUTPUT COMMUNICATIONS

RELATED APPLICATIONS

This application is related to and claims priority from U.S. Provisional Patent Application Ser. No. 61/602,268 filed Feb. 23, 2012, for "DEVICES FOR MULTI-SOURCE MULTIPLE-INPUT MULTIPLE-OUTPUT COMMUNICATIONS," which is hereby incorporated by reference in its entirety.

TECHNICAL FIELD

The present disclosure relates generally to electronic communications. More specifically, the present disclosure relates to systems and methods for applying multi-source multiple-input multiple-output communications.

BACKGROUND

Communication systems are widely deployed to provide various types of communication content such as data, voice, video and so on. These communication systems may be capable of supporting simultaneous communication between multiple communication devices (e.g., base stations, wireless communication devices, access points, access terminals, etc.).

The use of communication devices has dramatically increased over the past few years. For example, cellular phones, smartphones, laptop computers, tablet devices and other communication devices have become commonplace in society. These communication devices often provide access to a network. This may allow a user to make a phone call, receive an email or browse the Internet, for instance.

As the use of communication devices has increased, improvements in coverage area, speed and quality for communication devices are being sought. For example, weaker signals, slower speeds and/or lack of coverage in some areas are current challenges in wireless communication systems. As can be seen from this discussion, systems and methods that improve coverage area, speed and/or quality may be beneficial.

SUMMARY

A method for applying multi-source multiple-input multiple-output communications by a base station is described. The method includes obtaining data for transmission to a wireless communication device. The method also includes sending a second portion of the data to an assisting base station. The method further includes sending an indication frame that includes an identifier of the wireless communication device to the assisting base station. The method further includes transmitting a first portion of the data on a first set of spatial streams.

The indication frame may include an identifier of data to be transmitted. The indication frame may specify a duration of a pending multi-source multiple-input multiple-output transmission. The method may include determining a modulation and coding scheme for the assisting base station. The second portion of the data and the indication frame may be sent to the assisting base station via a wired link. The second portion of the data and the indication frame may be sent to the assisting base station via power line link. The method may include sending a request to transmit all or part of the second portion of the data. The indicator frame may be selected from a group consisting of a unicast frame and a broadcast frame.

Another method for applying multi-source multiple-input multiple-output communications by a base station is described. The method includes receiving a second portion of data that is part of a multi-source multiple-input multiple-output transmission. The method also includes receiving an indication frame that includes an identifier of a wireless communication device. The method further includes transmitting all or part of the second portion of the data on a second set of spatial streams.

The indication frame may include an identifier of data to be transmitted. The indication frame may specify a duration of a pending multi-source multiple-input multiple-output transmission. The method may include comprising determining a modulation and coding scheme. The second portion of the data and the indication frame may be received via a wired link. The second portion of the data and the indication frame may be received via power line link. The method may include receiving a request to transmit all or part of the second portion of the data.

A base station for applying multi-source multiple-input multiple-output communications is described. The base station includes multi-source multiple-input multiple-output communication circuitry that obtains data for transmission to a wireless communication device. The multi-source multiple-input multiple-output communication circuitry also sends a second portion of the data to an assisting base station. The multi-source multiple-input multiple-output communication circuitry also sends an indication frame that includes an identifier of the wireless communication device to the assisting base station. The multi-source multiple-input multiple-output communication circuitry further transmits a first portion of the data on a first set of spatial streams.

Another base station for applying multi-source multiple-input multiple-output communications is described. The base station includes multi-source multiple-input multiple-output communication circuitry that receives a second portion of data that is part of a multi-source multiple-input multiple-output transmission. The multi-source multiple-input multiple-output communication circuitry also receives an indication frame that includes an identifier of a wireless communication device. The multi-source multiple-input multiple-output communication circuitry further transmits all or part of the second portion of the data on a second set of spatial streams.

A computer-program product for applying multi-source multiple-input multiple-output communications is described. The computer-program product includes a non-transitory tangible computer-readable medium having instructions that include code for causing a base station to obtain data for transmission to a wireless communication device. The instructions also include code for causing the base station to send a second portion of the data to an assisting base station. The instructions also include code for causing the base station to send an indication frame that includes an identifier of the wireless communication device to the assisting base station. The instructions further include code for causing the base station to transmit a first portion of the data on a first set of spatial streams.

Another computer-program product for applying multi-source multiple-input multiple-output communications. The computer-program product includes a non-transitory tangible computer-readable medium having instructions that include code for causing a base station to receive a second portion of data that is part of a multi-source multiple-input multiple-output transmission. The instructions also include code for causing the base station to receive an indication frame that includes an identifier of a wireless communication device. The instructions further include code for causing the base station to transmit all or part of the second portion of the data on a second set of spatial streams.

An apparatus for applying multi-source multiple-input multiple-output communications is described. The apparatus includes means for obtaining data for transmission to a wireless communication device. The apparatus also includes means for sending a second portion of the data to an assisting base station. The apparatus also includes means for sending an indication frame that includes an identifier of the wireless communication device to the assisting base station. The apparatus further includes means for transmitting a first portion of the data on a first set of spatial streams.

Another apparatus for applying multi-source multiple-input multiple-output communications is described. The apparatus includes means for receiving a second portion of data that is part of a multi-source multiple-input multiple-output transmission. The apparatus also includes means for receiving an indication frame that includes an identifier of the wireless communication device. The apparatus further includes means for transmitting all or part of the second portion of the data on a second set of spatial streams.

DETAILED DESCRIPTION

Figure 1:
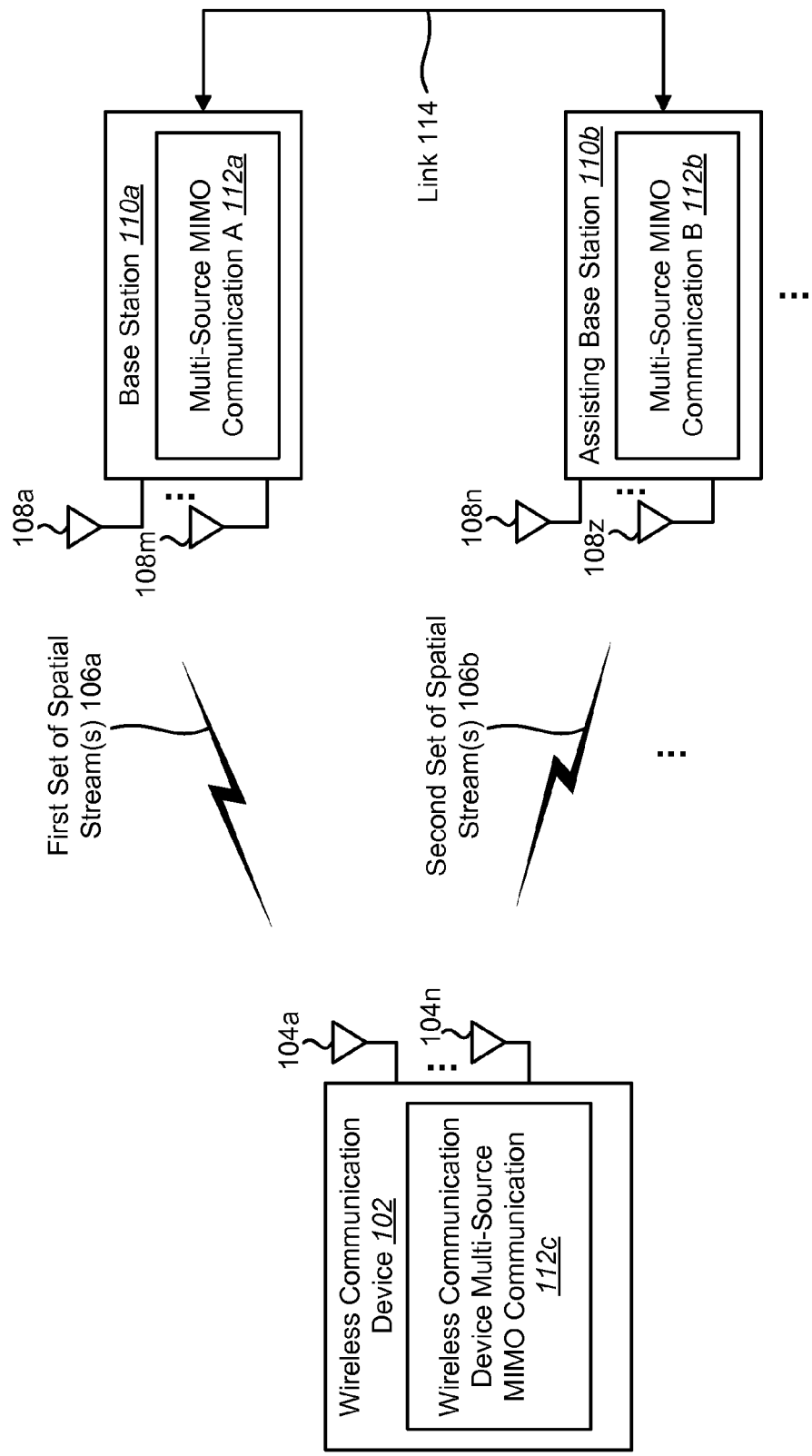
FIG. 1 is a block diagram illustrating one configuration of base stations and a wireless communication device in which systems and methods for applying multi-source multiple-input multiple-output (MIMO) communications may be implemented.

Some types of communication devices provide access to a network. Examples of these communication devices include base stations, nodes, access points, wireless gateways and wireless routers. Examples of networks include, but are not limited to, a telephone network (e.g., a "land-line" network such as the Public-Switched Telephone Network (PSTN) or cellular phone network), the Internet, a Local Area Network (LAN), a Wide Area Network (WAN), a Metropolitan Area Network (MAN), etc. The term "base station" may be used herein to generally refer to a communication device that provides access to a network. The term "cell" can refer to a base station and/or its coverage area depending on the context in which the term is used. It should be noted that a base station may communicate with one or more wireless communication devices that are within a cell or sector coverage area. For example, a cell or sector is a geographical area serviced by a base station. A single base station may provide one or more cells or sectors for communication. For example, a base station may provide three sectors for communication with the wireless communication device. As used herein, the term "cell" may be used to refer to a cell and/or a sector.

Examples of a "base station" include cellular telephone base stations, access points, wireless gateways, wireless routers, hotspot devices, etc. In some implementations, a base station may communicate with a network using a wired link and may communicate with wireless communication devices using a wireless link.

Some types of communication devices wirelessly communicate with one or more devices. Examples of these "wireless communication devices" include access terminals, clients, client devices, client stations, mobile devices, mobile stations, mobile terminals, terminals, user terminals, subscriber units, subscriber stations, User Equipments, remote stations, cellular phones, smartphones, tablet devices, desktop computers, laptop computers, gaming systems (mobile or otherwise, for instance), personal digital assistants, wireless cards, wireless modems, handheld devices, laptop computers, session initiation protocol phones, wireless local loop (WLL station) e-readers, etc. In some configurations, a wireless communication device may communicate with the base station in order to access a network.

Some communication devices (e.g., base station and/or wireless communication device) may operate or be anticipated to operate in accordance with certain industry standards, such as the Institute of Electrical and Electronics Engineers (IEEE) 802.11a, 802.11b, 802.11g, 802.11n, 802.11z and/or 802.11ac (e.g., Wireless Fidelity or "Wi-Fi") standards. Other examples of standards that a communication device may comply with include IEEE 802.16 (e.g., Worldwide Interoperability for Microwave Access or "WiMAX"), Third Generation Partnership Project (3GPP), 3GPP Long Term Evolution (LTE) and others (e.g., where a base station may be referred to as a NodeB, evolved NodeB (eNB), etc., and a wireless communication device may be referred to as a user equipment (UE)). It should be noted that the systems and methods disclosed herein are also applicable to other technologies, such as technologies and the associated standards related to Code Division Multiple Access (CDMA), Time Division Multiple Access (TDMA), Frequency Division Multiple Access (FDMA), Orthogonal Frequency Division Multiple Access (OFDMA) and so forth. Thus, communication devices may be described with varying nomenclatures according to industry standards (as an access terminal, user equipment (UE), remote terminal, access point, base station, Node B, evolved Node B (eNB), etc., for example). While some of the systems and methods disclosed herein may be described in terms of one or more standards, this should not limit the scope of the disclosure, as the systems and methods may be applicable to many systems and/or standards.

The systems and methods disclosed herein may enable multi-source MIMO. Some acronyms that may be used herein are given as follows: Access Point (AP), Basic Service Set (BSS), Media Access Control (MAC), Station (STA), Tunneled Direct Link Setup (TDLS), Wi-Fi Alliance (WFA), Wireless Fidelity (Wi-Fi), Multiple-Input Multiple-Output (MIMO), Powerline Communications (PLC), Multi-Source (MS), Multi-Source MIMO (MS-MIMO), Modulation and Coding Scheme (MCS), Signal-to-Noise Ratio (SNR), MAC Protocol Data Unit (MPDU) and Block Acknowledgement (BA).

The throughput to a wireless communication device (e.g., client station device) may dip (e.g., be reduced) when the wireless communication device moves in between two base stations (e.g., access points) to the point that the distance to each base station is maximal. The systems and methods disclosed herein provide approaches to reduce the throughput dip.

It should be noted that the term "apparatus" may be used herein to refer to a base station, a wireless communication device and/or other device. It should also be noted that a "communication system" may include one or more of a base station, a wireless communication device and/or other device(s).

It should also be noted that the term "concurrent" and variations thereof may be used herein to indicate that two or more events may overlap each other to some extent in time. However, "concurrent" events may or may not begin and/or end at the same time.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of base stations 110a-b and a wireless communication device 102 in which systems and methods for applying multi-source MIMO communications may be implemented. Multiple base stations 110a-b may communicate with (e.g., send signals to) a wireless communication device 102. For example, the base stations 110a-b may communicate with the wireless communication device 102 via a wireless network. For instance, a base station 110a may include one or more antennas 108a-m and may send signals to the wireless communication device 102 on a first set of spatial streams 106a. As used herein, the phrase "set of spatial streams" indicates one or more spatial streams. For example, the first set of spatial streams 106a may include two spatial streams.

One example of the systems and methods disclosed herein is given as follows. In order to reduce a throughput dip between two base stations 110a-b (e.g., access points), each of the base stations 110a-b may include one or more antennas 108a-m, 108n-z that may send data to the wireless communication device 102 (e.g., station) on a different set of spatial streams 106a-b (resulting in open loop MIMO, for example). For instance, a wireless communication device 102 (e.g., station) with four antennas 104a-n that sits between a base station 110a and an assisting base station 110b, may receive two spatial streams 106a from the base station 110a and two spatial streams 106b from the assisting base station 110b. The first set of spatial streams 106a is different from the second set of spatial streams 106b. Together, the two base stations 110a-b may be able to send twice the amount of power to the wireless communication device 102, which may result in a 3 decibel (dB) gain. Furthermore, there may be additional diversity gain since the spatial streams 106a-b come from two different directions. The effective data rate to the wireless communication device 102 may be much higher as a result.

The first set of spatial streams 106a may carry a first portion of data and the second set of spatial streams 106b may carry a second portion of data. The second portion of data may be the same as the first portion of data, may include the first portion of data in addition to other data, may contain a subset of the first portion of data, may contain a subset of the first portion of data in addition to other data (e.g., overlap the first portion of data) or may only include data not included in the first portion of data. In general, the first portion of data may be same as or different from the second portion of data. The first portion of the data may be part of a multi-source MIMO transmission and the second portion of the data may also be part of the multi-source MIMO transmission. For example, a multi-source MIMO transmission may include portions of data transmitted on separate spatial streams from multiple sources (e.g., base stations) (where at least part of the MIMO transmission is sent by one base station and at least one other part is sent from another base station, for example). It should be noted that multi-source MIMO communications (e.g., transmissions) may be provided by two or more devices (e.g., base stations).

One approach for splitting the data is that a base station 110a (e.g., access point) with which the wireless communication device 102 (e.g., station) is currently associated sends packet data to an assisting base station 110b (e.g., access point) for transmission to the wireless communication device 102. In some configurations, the packet data that is sent to the assisting base station 110b may include prepared media access protocol data units (MPDUs) (complete with Media Access Control (MAC) header and encryption, for example). This way, the assisting base station 110b may simply send the packet data when requested by the base station 110a. When the base station 110a obtains a transmission opportunity (TXOP), it 110a may send an indication frame (e.g., short frame) to the assisting base station 110b that includes an identifier of the wireless communication device 102 to which data will be transmitted. In some configurations or instances, the indication frame may additionally include an identifier of which data to transmit. As will be described in detail below, the indication frame may also include other indication elements (e.g., data identifier, duration of pending transmission, etc.). The indication frame may be a unicast frame or a broadcast frame. In some configurations, the indication frame may include and/or specify a duration of a pending multi-source MIMO transmission.

The wireless communication device 102 may receive the signals on the spatial streams 106a-b from the multiple base stations 110a-b using multiple antennas 104a-n. For example, the wireless communication device 102 may include a wireless communication device multi-source MIMO communication block/module 112c. As used herein, the phrase "block/module" indicates that a particular component may be implemented in hardware, software or a combination of both. For example, the wireless communication device multi-source MIMO communication block/module 112c may be implemented with hardware components such as circuitry and/or software components such as instructions or code, etc.

The wireless communication device multi-source MIMO communication block/module 112c may enable the wireless communication device 102 to communicate with the base stations 110a-b over the spatial streams 106a-b in order to coordinate communications between the base stations 110a-b and the wireless communication device 102. For example, the wireless communication device multi-source MIMO communication block/module 112c may allow the wireless communication device 102 to receive a first portion of data from the base station 110a. Similarly, the wireless communication device multi-source MIMO communication block/module 112c may allow the wireless communication device 102 to receive a second portion of data from the assisting base station 110b. As described above, the second portion of data may be the same as or different from the first portion of data. When the first portion of data and the second portion of data include the same data, the wireless communication device multi-source MIMO communication block/module 112c may utilize spatial diversity in order to more reliably receive the data. Additionally or alternatively, when the first portion of data and the second portion of data include different data, the wireless communication device multi-source MIMO communication block/module 112c may utilize the multiple spatial streams 106a-b to increase the amount of data received. In some cases, the wireless communication device multi-source MIMO communication block/module 112c may combine the first and second portion of data.

The base stations 110a-b may communicate with each other over a link 114. The link 114 may be a wired or wireless link. One example of the link 114 is a power line link (e.g., a power line link 114 based on power line communication (PLC)). For instance, the base station 110a and the assisting base station 110b may communicate with each other over a wired connection that is also used for electrical power transmission. In some implementations, the base station 110a and the assisting base station 110b may be included in a local area network. For example, the base station 110a and the assisting base station 110b may be located in a single building that includes a local area network.

Each of the base stations 110a-b may include a multi-source MIMO communication block/module 112a-b. For example, the base station 110a may include multi-source MIMO communication block/module A 112a and the assisting base station 110b may include multi-source MIMO communication block/module B 112b. The multi-source MIMO communication block/modules 112a-b may enable the base stations 110a-b to communicate with one or more other base stations 110a-b over the link 114 in order to coordinate communications between the base stations 110a-b and the wireless communication device 102 on multiple spatial streams 106a-b.

In one example, the wireless communication device 102 may be currently associated with the base station 110a. The base station 110a (via the multi-source MIMO communication block/module A 112a, for example) may send a second portion of data via the link 114 to the assisting base station 110b for transmission to the wireless communication device 102. In this implementation, the base station 110a may send a request to the assisting base station 110b to transmit the second portion of data to the wireless communication device 102. Additionally, the base station 110a may send an indication frame to the assisting base station 110b via the link 114. In some configurations, the indication frame may identify the wireless communication device 102, may identify which data to transmit and/or may indicate a duration of a pending multi-source MIMO transmission. In some configurations, identifying which data to transmit may include adding a bit (or other identifier) to the data that indicates data to be transmitted via a multi-source MIMO transmission. Indicating a duration of a pending multi-source MIMO transmission may include indicating a number of frames over which a multi-source MIMO transmission may occur. In another example, the indication frame may indicate a duration of the pending multi-source MIMO transmission by including a termination frame that indicates when a pending multi-source MIMO transmission is to be completed. In some configurations, the indication frame may include one or more MPDU sequence numbers. For example, the base station 110a may indicate the data to be sent based on one or more MPDU sequence numbers. For example, the base station 110a may include one or more MPDU sequence numbers in an indication frame. The one or more MPDU sequence numbers may indicate the data to be transmitted by the assisting base station 110b. The indication frame may be a unicast frame or a broadcast frame. As will be described in detail below, the base station 110a may direct the assisting base station 110b to apply a particular MCS to transmit the data to the wireless communication device 102.

Figure 2:
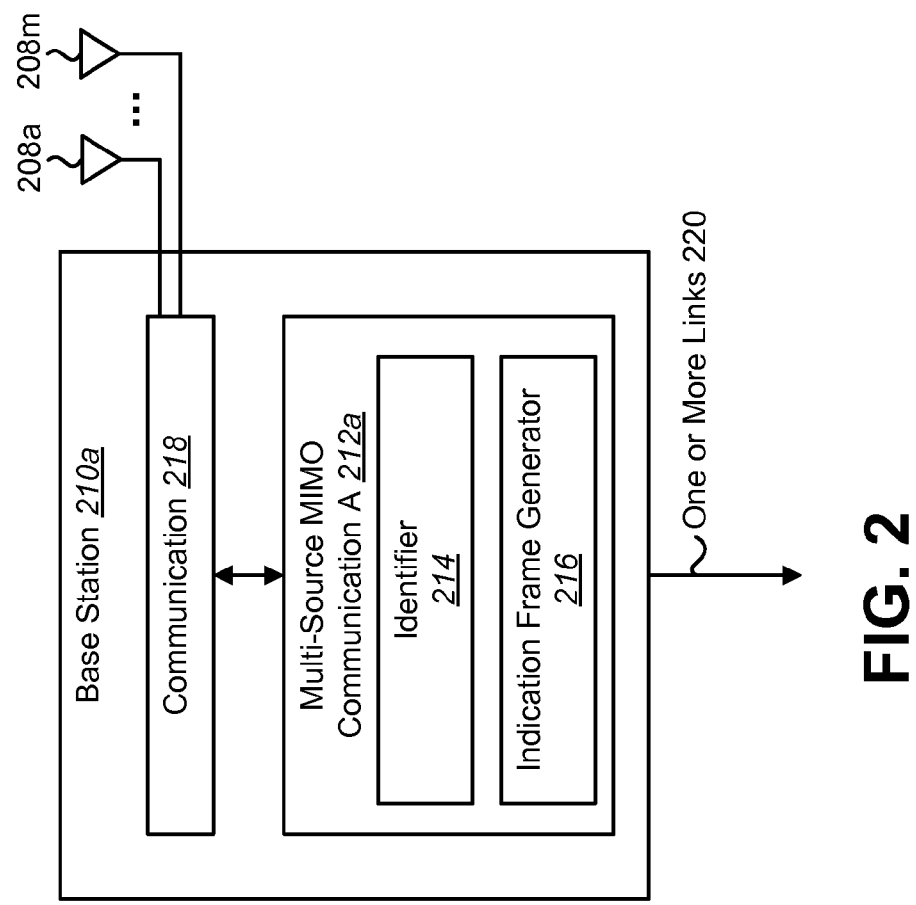
FIG. 2 is a block diagram illustrating one configuration of a base station in which systems and methods for applying multi-source MIMO communications may be implemented.

FIG. 2 is a block diagram illustrating one configuration of a base station 210a in which systems and methods for applying multi-source MIMO communications may be implemented. The base station 210a may be an example of the base station 110a described in connection with FIG. 1. The base station 210a may include multi-source MIMO communication block/module A 212a and/or one or more antennas 208a-m that may be examples of corresponding elements described in connection with FIG. 1.

In some implementations, multi-source MIMO communication block/module A 212a may include an identifier 214 and an indication frame generator 216. The identifier may identify the wireless communication device 102 that is to receive at least a portion of the data. Examples of identifiers 214 include, but are not limited to, station identifiers, wireless communication device 102 names, media access control addresses, internet protocol addresses and locations.

The indication frame generator 216 may generate an indication frame that includes the identifier 214 of the wireless communication device 102. In some implementations, the wireless communication device 102 (via the indication frame generator 216, for example) may generate an indication frame that may be sent specifically to a particular assisting base station 110b. In other words, the indication frame may be a unicast frame. For instance, the indication frame may be addressed to a single assisting base station 110b. Alternatively, the wireless communication device 102 may generate an indication frame that is a broadcast frame. For example, the indication frame may be addressed to any and all other nodes (e.g., base stations) on one or more links 114.

In some implementations, the base station 210a may include a communication block/module 218 that allows the base station 210a to communicate with one or more other devices. For example, the communication block/module 218 may include one or more transmitters/receivers, modulators/demodulators, encoders/decoders, etc. In some configurations, the communication block/module 218 may provide wired and wireless communication. The communication block/module 218 may be coupled to multi-source MIMO communication block/module A 212*a*. The communication block/module 218 may allow the base station 210*a* to transmit signals to and/or receive signals from (e.g., transmit the first portion of the data to and receive one or more block acknowledgement frames from) the wireless communication device 102. Similarly, the communication block/module 218 may allow the base station 210*a* to transmit/receive data from one or more assisting base stations 110*b* (e.g., transmit a second portion of the data, an indication frame and/or one or more block acknowledgement frames and receive an MCS). The communication block/module 218 may also allow the base station 210*a* to obtain the data to be transmitted. For example, the communication block/module 218 may allow the base station 210*a* to receive the data from a network that is connected to the base station 210*a*.

The base station 210*a* may communicate with one or more other devices via one or more links 220. For example, the one or more links 220 may include a link 114 to an assisting base station 110*b* and/or one or more spatial streams 106*a-b* for communicating with a wireless communication device 102. The one or more links 220 may also provide a communication medium between the base station 210*a* and a source of the data to be transmitted. For example, the base station 210*a* may receive the data from a data source via a wireless and/or a wired link 220.

Figure 3:
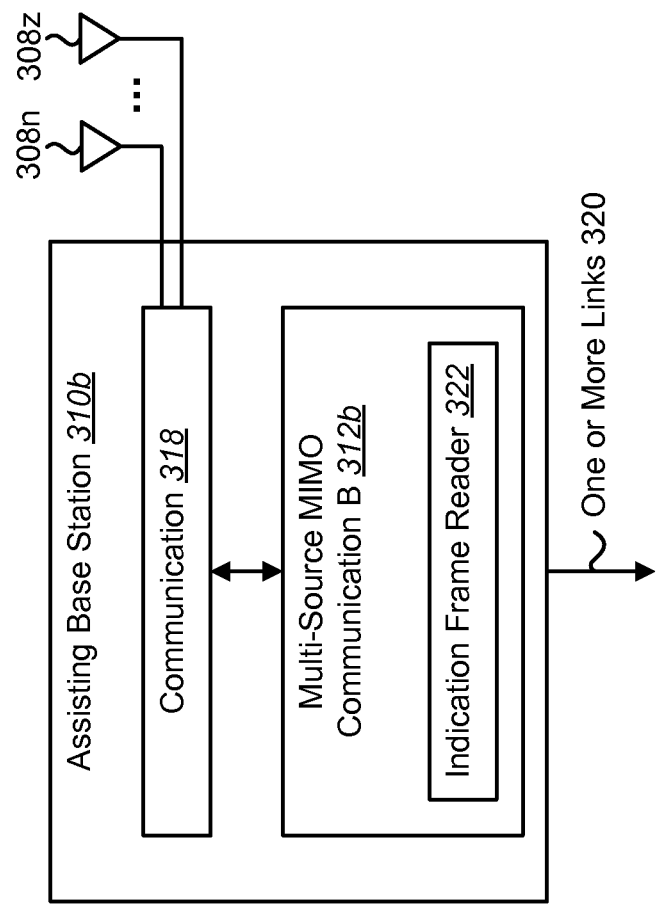
FIG. 3 is a block diagram illustrating one configuration of an assisting base station in which systems and methods for applying multi-source MIMO communications may be implemented.

FIG. 3 is a block diagram illustrating a more specific configuration of an assisting base station 310*b* in which systems and methods for applying multi-source MIMO communications may be implemented. The assisting base station 310*b* may be an example of the assisting base station 110*b* described in connection with FIG. 1. The assisting base station 310*b* may include multi-source MIMO communication block/module B 312*b*, one or more antennas 308*n-z*, a communication block/module 318 and/or one or more links 320 that may be examples of corresponding elements described in connection with FIG. 1.

In some implementations, multi-source MIMO communication block/module B 312*b* may include an indication frame reader 322. The indication frame reader 322 may read the information contained in the indication frame. For example, the indication frame reader 322 may identify a wireless communication device 102 that is to receive a portion of the data. For example, the indication frame reader 322 may identify the wireless communication device 102 based on the identifier 214 that may be included in the indication frame. In this implementation, the assisting base station 310*b* may then send the second portion of data to the wireless communication device 102 indicated by the identifier 214.

Figure 4:
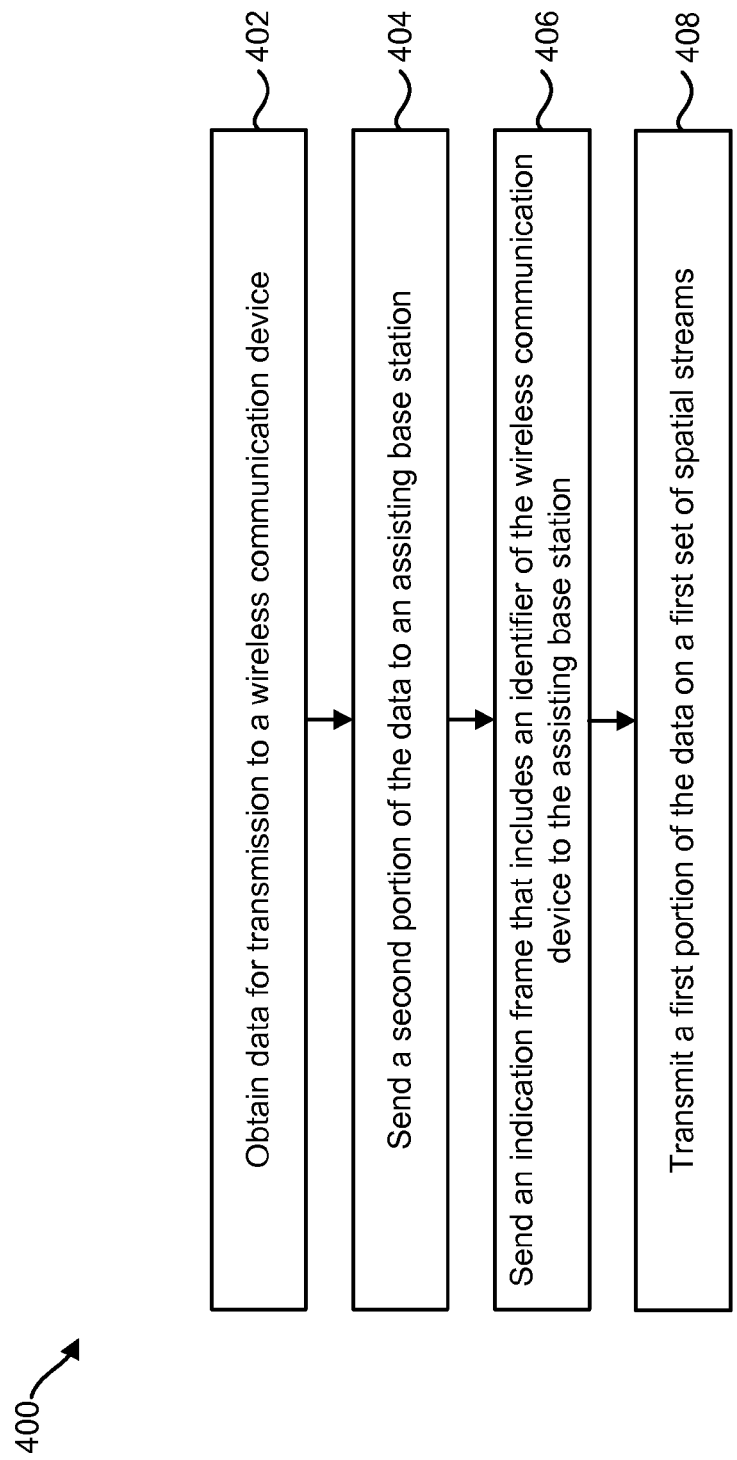
FIG. 4 is a flow diagram illustrating one configuration of a method for applying multi-source MIMO communications.

FIG. 4 is a flow diagram illustrating one configuration of a method 400 for applying multi-source MIMO communications. The method 400 may be performed by the base station 110*a* in some configurations. The base station 110*a* (e.g., an access point) may obtain 402 data for transmission to a wireless communication device 102 (e.g., a station). For example, the base station 110*a* may obtain 402 the data by receiving it from a network (e.g., the Internet, a LAN, the PSTN, a cellular telephone network, etc.). The data for transmission may be data for a multi-source MIMO transmission.

The base station 110*a* may send 404 a second portion of the data to the assisting base station 110*b*. The second portion of the data may be part of a multi-source MIMO transmission. The second portion of the data may be all or part of the data to be transmitted. Additionally, the second portion of the data may include all of, part of or none of the first portion of the data as described above. In some implementations, the second portion of the data may include prepared MPDUs. As described above, the base station 110*a* may send 404 the second portion of data via a wired link in some configurations (e.g., a power line link). For instance, the base station 110*a* may send 404 the second portion of the data to the assisting base station 110*b* over a wired connection that is also used for electrical power transmission.

The base station 110*a* may send 406 an indication frame that includes an identifier 214 of the wireless communication device 102 to the assisting base station 110*b*. In some configurations, the base station 110*a* may send 406 the indication frame when the base station 110*a* obtains a transmission opportunity. The indication frame may additionally or alternatively direct the assisting base station 110*b* to begin transmitting all or a part of the second portion of the data at a particular time. The second portion of the data may be sent 404 and the indication frame may be sent 406 via the link 114 (e.g., a power line link). For instance, the base station 110*a* may send 406 the indication frame to the assisting base station 110*b* over a wired connection that is also used for electrical power transmission. In some implementations, the base station 110*a* may send 406 the indication frame independent of a request from the wireless communication device 102.

The base station 110*a* may transmit 408 a first portion of the data on a first set of spatial streams 106*a*. The first portion of the data may be part of a multi-source MIMO transmission. In some implementations, the first portion of the data may include all or a part of the data to be transmitted. The first portion of the data may include all of, some of, or none of the second portion as described above. The first set of spatial streams 106*a* may include one or more spatial streams. In some implementations, one or more of the steps of the method 400 may be performed as part of an ongoing transmission. It should be noted that sending 404 the second portion, sending 406 the indication frame and transmitting 408 the first portion may be performed in any order. Additionally or alternatively, one or more of sending 404 the second portion, sending 406 the indication frame and transmitting 408 the first portion may be performed concurrently.

Figure 5:
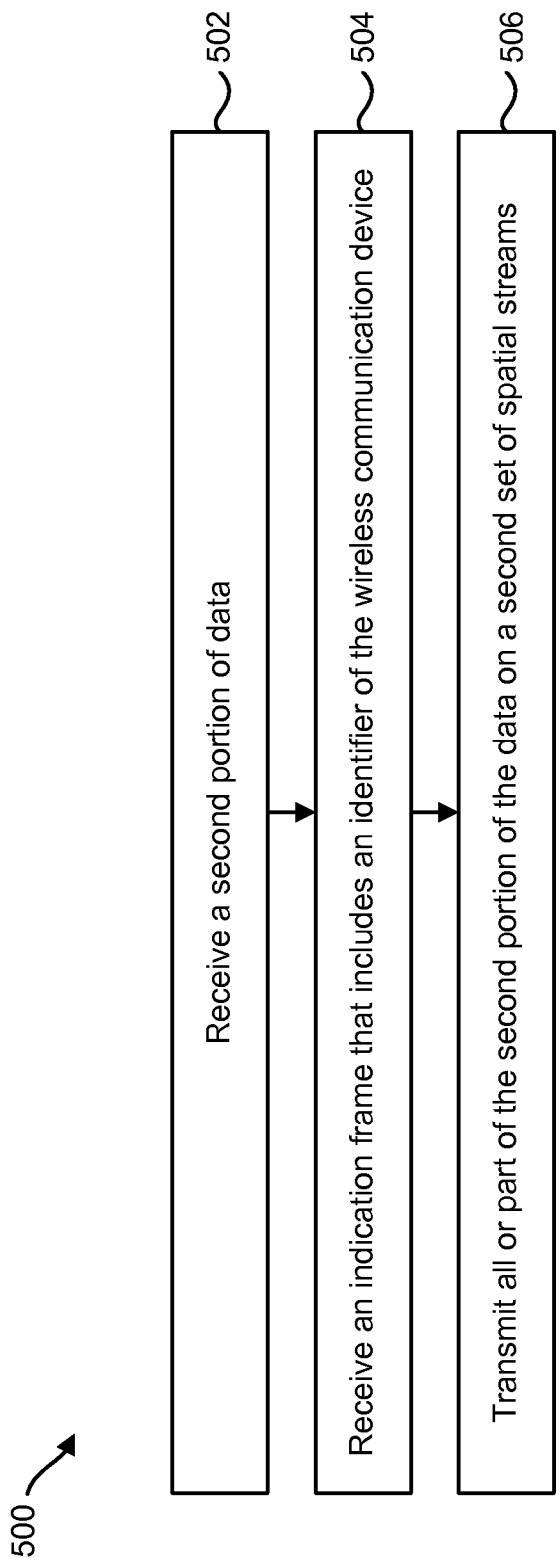
FIG. 5 is a flow diagram illustrating another configuration of a method for applying multi-source MIMO communications.

FIG. 5 is a flow diagram illustrating another configuration of a method 500 for applying multi-source MIMO communications. The method 500 may be performed by the assisting base station 110*b*. The assisting base station 110*b* (e.g., an access point) may receive 502 a second portion of data. The second portion of the data may be part of a multi-source MIMO transmission. For instance, the assisting base station 110*b* may receive 502 a second portion of data from the base station 110*a*.

The assisting base station 110*b* may receive 504 an indication frame that includes an identifier 214 of the wireless communication device 102. In some implementations, the indication frame may also include an identifier of data for transmission (from the second portion of data, for example), MCS information, a pending transmission duration and/or a particular time to transmit data.

The assisting base station 110*b* may transmit 506 all or part of the second portion of the data on a second set of spatial streams 106*b*. In some configurations, the assisting base station 110*b* may transmit 506 all or part of the second portion of the data based on the indication frame (that indicates all or part of the second portion of the data, for example). In some implementations, one or more of the steps of the method 500 may be performed as part of an ongoing transmission. It should be noted that receiving 502 the second portion and receiving 504 the indication frame may be performed in any order. Additionally or alternatively, one or more of receiving 502 the second portion and receiving 504 the indication frame may be performed concurrently.

Figure 6:
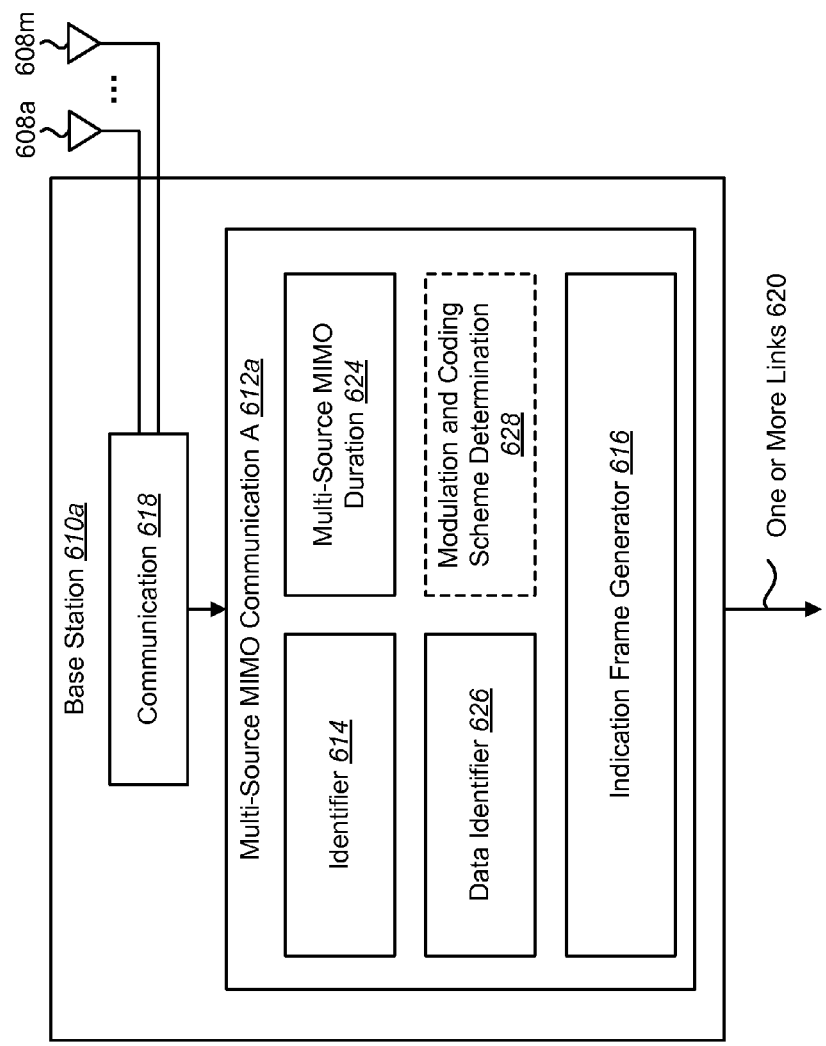
FIG. 6 is a block diagram illustrating a more specific configuration of a base station in which systems and methods for applying multi-source MIMO communications may be implemented.

FIG. 6 is a block diagram illustrating a more specific configuration of a base station 610a in which systems and methods for applying multi-source MIMO communications may be implemented. The base station 610a may be an example of the base station 110a described in connection with FIG. 1. The base station 610a may include multi-source MIMO communication block/module A 612a, communication block/module 618, one or more links 620 and/or one or more antennas 608a-m that may be examples of corresponding elements described in connection with one or more of FIGS. 1 and 3. Additionally, multi-source MIMO communication block/module A 612a may include an identifier 614 and/or an indication frame generator 616 that may be examples of corresponding elements described in connection with FIG. 2. Multi-source MIMO communication block/module A 612a may include a multi-source MIMO duration block/module 624 and/or a data identifier 626. Optionally, multi-source MIMO communication block/module A 612a may include an MCS determination block/module 628.

The multi-source MIMO duration block/module 624 may specify a duration of a pending multi-source MIMO transmission. For example, the multi-source MIMO duration block/module 624 may specify a number of frames to perform multi-source MIMO transmission, one or more frame numbers corresponding to the multi-source MIMO transmission, an amount of data to transmit, a duration of time to perform multi-source MIMO transmission and/or one or more of a transmission start time and a transmission end time. In yet another implementation, the multi-source MIMO duration block/module 624 may determine which frames may be used to perform multi-source MIMO transmission. For example, the multi-source MIMO duration block/module 624 may make use of the data identifier 626 to indicate that a particular frame (or sequence of frames) may be used for multi-source MIMO transmission.

The data identifier 626 may identify the data to be transmitted to the wireless communication device 102. For example, the data identifier 626 may include a header incorporated into the data that identifies it as data to be transmitted to the wireless communication device 102. In another example, the base station 610a could determine the first portion and second portion of data and utilize the data identifier 626 accordingly. For instance, the base station 610a may determine whether the second portion of data should be the same as or different from the first portion of data. In particular, the base station 610a may determine to send the same data on both sets of spatial streams in poor channel conditions (e.g., cases where redundancy on the two sets of spatial streams may be useful to improve reception). Or, the base station 610a may determine to send different data on each set of spatial streams when channel conditions allow higher throughput. The data identifier 626 may accordingly indicate the second portion of data. In some configurations, the data identifier 626 may identify the second portion of data in relationship to the first portion of data. In some configurations, the data identifier 626 may be one or more MPDU sequence numbers (that identify the second portion of data, for instance).

The data identifier 626 may identify all and/or part of the data to be transmitted. For example, the base station 610a may identify all of the data to be transmitted by a first data identifier 626 and may identify the second portion of the data to be transmitted by a second data identifier 626. In some implementations, the data identifier 626 may identify whether the base stations are transmitting the same data or different data. For example, in the case that the base station 610a sends the same data on both sets of spatial streams, the data identifier 626 may so indicate. By comparison, if the base station 610a determines to send different data on the spatial streams, the data identifier 626 may so indicate.

The MCS determination block/module 628 may determine the MCS for the assisting base station 110b and/or the base station 610a. In some configurations, the base station 610a (e.g., main access point) may base the MCS of the assisting base station 110b (e.g., assisting access point) on received block acknowledgement frames. For instance, the sequence numbers of MPDUs sent by the base station 610a (e.g., main access point) tie into the MCS selection at the base station 610a (e.g., main access point) and the sequence numbers of MPDUs sent by the assisting base station 110b (e.g., assisting access point) tie into the MCS selection for the assisting base station 110b (e.g., assisting access point). For example, the MCS determination block/module 628 may determine the MCS based on one or more received block acknowledgement frames, where the MCS for the base station 610a may be determined based on the sequence numbers of MPDUs sent by the base station 610a and where the MCS for the assisting base station 110b may be determined based on the sequence numbers of MPDUs sent by the assisting base station 110b. In some implementations, the base station 610a may implicitly indicate the MCS for the assisting base station 110b by sending or indicating one or more MPDU sequence numbers. In other words, the base station 610a may send the MDPU sequence number(s) to the assisting base station 110b. The assisting base station 110b may then determine an MCS for transmitting data based on the received MPDU sequence numbers.

In some configurations, if the number of block acknowledgements implies a good channel, the base station 610a could maintain and/or increase an MCS index (e.g., modulation order and/or coding rate). However, if the number of block acknowledgements implies a high error rate, the base station 610a could decrease the MCS index. The base station 610a may notify the assisting base station 110b of the MCS. For example, the base station 610a may send a message via the one or more links 620 that indicates an MCS. This message may or may not be part of the indication frame. The MCS that the base station 610a directs the assisting base station 110b to apply may or may not be the same MCS utilized for the first set of spatial stream(s) 606a.

In some configurations, the base station 610a may determine the MCS of the assisting base station 110b based on a received MCS. For example, the base station 610a may receive an MCS that the assisting base station 110b is applying, or anticipates applying, for transmission to the wireless communication device 102. The MCS determination block/module 628 of the base station 610a may then determine the MCS of the assisting base station 110b based on the received MCS. In some implementations, the indication frame generator 616 may generate the indication frame based on one or more indications. In other words, the indication frame generator 616 may include one or more of an identifier 614, a multi-source MIMO duration (from the multi-source MIMO duration block/module 624), data identifier 626 and an MCS (from the MCS determination block/module 628) in the indication frame. Alternatively, the base station 610a may send the MCS to the assisting base station 110b in a separate message. In this example, the indication frame generator 616 may not include the MCS in the indication frame.

Additionally or alternatively, the base station 610a may send an indication frame including one or more MDPU sequence numbers that implicitly indicate the MCS. For example, the base station 610a may send one or more MPDU sequence numbers to the assisting base station 110b, which may utilize the MPDU sequence number(s) to determine an MCS. Additionally or alternatively, the MPDU sequence number(s) in the indication frame may be one example of the data identifier 626 (that indicates the data to be transmitted as described above, for instance). In another example, the base station 610a may send the MPDU sequence numbers to the assisting base station 110b separate from the indication frame.

Figure 7:
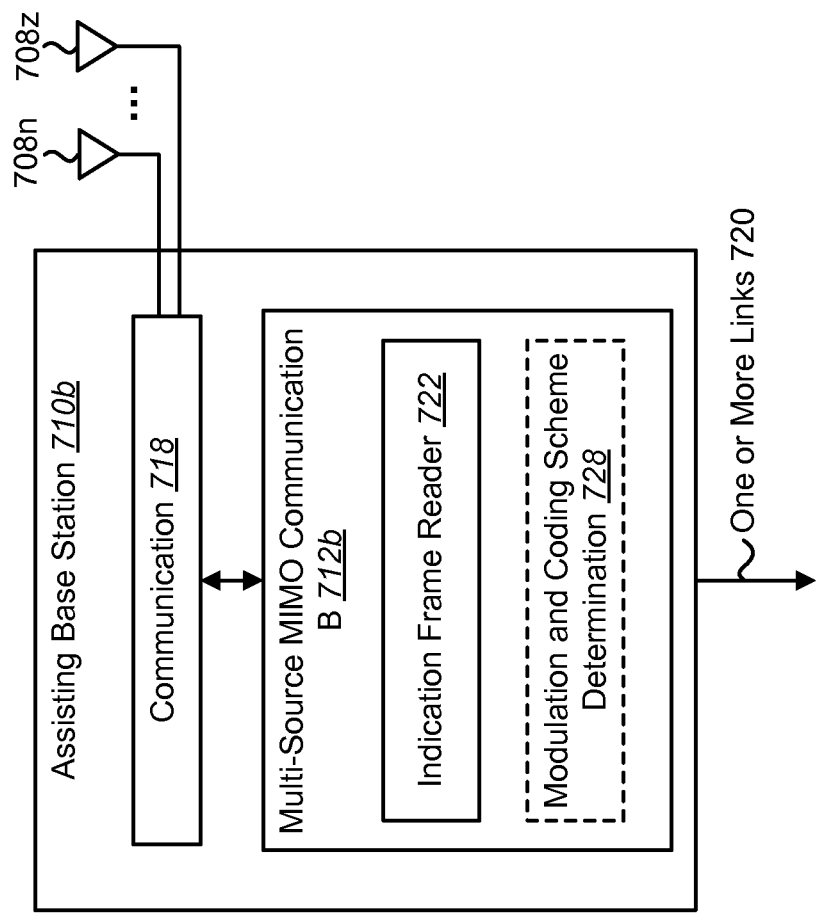
FIG. 7 is a block diagram illustrating a more specific configuration of an assisting base station in which systems and methods for applying multi-source MIMO communications may be implemented.

FIG. 7 is a block diagram illustrating a more specific configuration of an assisting base station 710b in which systems and methods for applying multi-source MIMO communications may be implemented. The assisting base station 710b may be an example of the assisting base station 110b described in connection with FIG. 1. The assisting base station 710b may include multi-source MIMO communication block/module B 712b, communication block/module 718, one or more links 720 and/or one or more antennas 708n-z that may be examples of corresponding elements described in connection with one or more of FIGS. 1 and 3. Multi-source MIMO communication block/module B 712b may include an indication frame reader 722 and/or an MCS determination block/module 728, one or more of which may be examples of corresponding elements described in connection with one or more of FIGS. 3 and 6.

The MCS determination block/module 728 may determine the MCS for the assisting base station 710b. In some implementations, the MCS determination block/module 728 may determine the MCS based on one or more block acknowledgement frames. For example, the assisting base station 710b may receive one or more block acknowledgement frames from the wireless communication device 102. Additionally or alternatively, the assisting base station 710b may receive from the base station 110a one or more block acknowledgement frames that the base station 110a has received from the wireless communication device 102. In these examples, the MCS determination block/module 728 may determine the MCS for the assisting base station 710b based on the block acknowledgement frames.

In some implementations, the MCS determination block/module 728 may determine the MCS based on a received MCS. For example, the assisting base station 710b may receive an MCS to use for transmission to the wireless communication device 102 from the base station 110a. In this example, the assisting base station 710b may receive the MCS via the communication block/module 718. In this example, the MCS determination block/module 728 may apply the received MCS.

In some implementations, the MCS determination block/module 728 may be coupled to the communication block/module 718. In this implementation, the assisting base station 710b may provide the MCS to another device, for example, the base station 110a.

Figure 8:
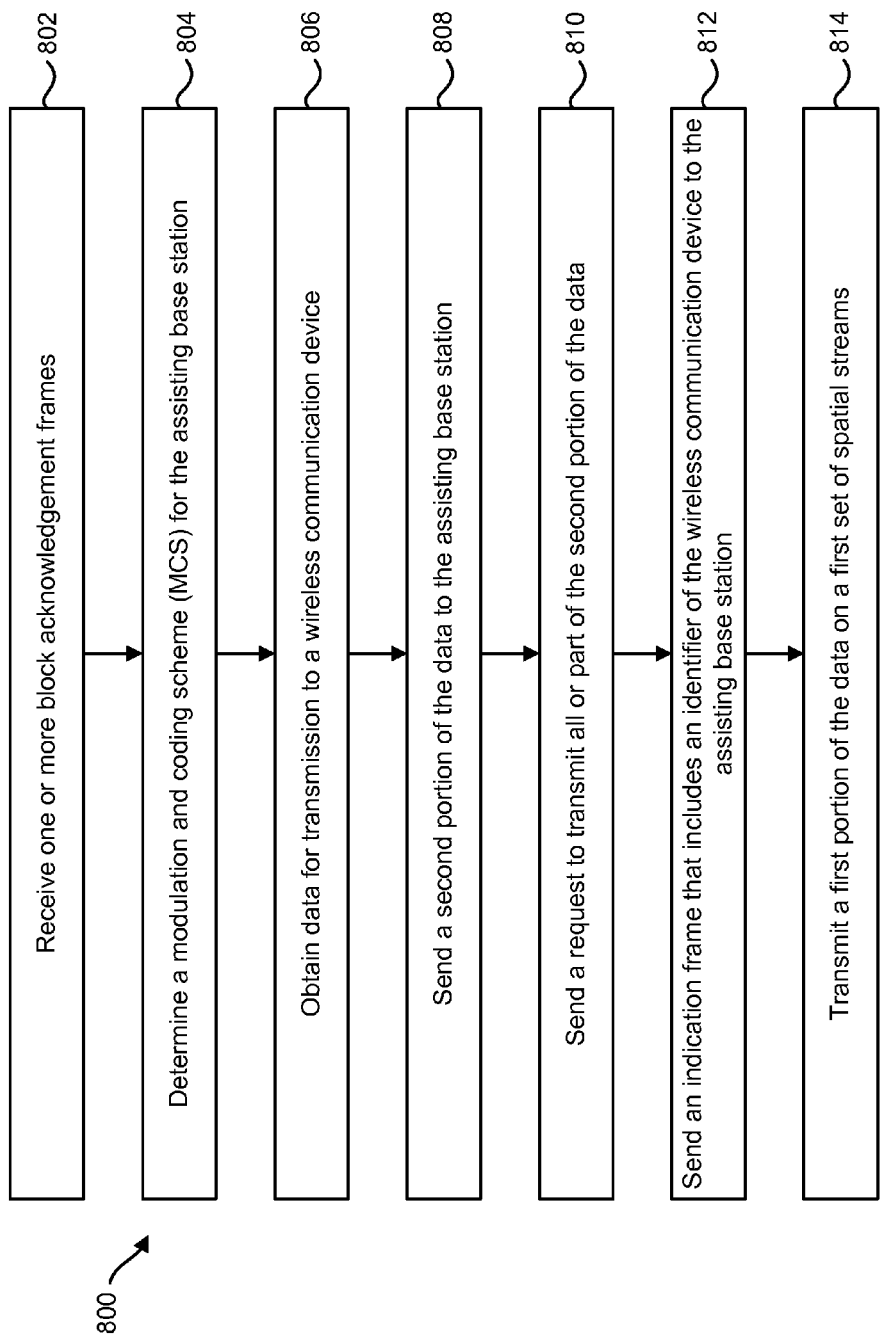
FIG. 8 is a flow diagram illustrating a more specific configuration of a method for applying multi-source MIMO communications.

FIG. 8 is a flow diagram illustrating a more specific configuration of a method 800 for applying multi-source MIMO communications. The method 800 may be performed by the base station 610a. The base station 610a may receive 802 one or more block acknowledgement frames. For example, the base station 610a may receive 802 one or more block acknowledgement frames from the wireless communication device 102. The block acknowledgement frames may indicate whether the wireless communication device 102 has successfully received data. In some implementations, the base station 610a may receive 802 one or more block acknowledgement frames associated with an ongoing or previous transmission. The base station 610a may then implement the received block acknowledgement frames in a current transmission.

In some implementations, the base station 610a may determine 804 an MCS for the assisting base station 110b. As described above, the base station 610a may determine 804 the MCS for the assisting base station 110b based on one or more of a received MCS (e.g., from the assisting base station 110b) and/or one or more received block acknowledgement frames (e.g., from the wireless communication device 102).

The base station 610a may obtain 806 data for transmission to a wireless communication device. In some implementations, this may be performed as described in connection with FIG. 4.

The base station 610a may send 808 a second portion of the data to the assisting base station 110b. In some implementations, this may be performed as described in connection with FIG. 4.

The base station 610a may send 810 a request to transmit all or part of the second portion of the data. In some implementations, the base station 610a may indicate to the assisting base station 110b a time to transmit the second portion of the data. The request may be included in the indication frame. For example, the base station 610a may direct the assisting base station 110b to transmit all or part of the second portion of the data after a certain amount of time. The base station 610a may request the assisting base station 110b to transmit all or part of the second portion of the data. For example, the base station 610a may send a request that directs the assisting base station 110b to send the second portion of the data (when a TXOP arises, in accordance with a schedule, etc., for example).

The base station 610a may send 812 an indication frame that includes an identifier 214 of the wireless communication device 102 to the assisting base station 110b. For example, this may be done as described in connection with FIG. 4. In some implementations, the indication frame may include the one or more received block acknowledgement frames. Alternatively, the base station 610a may send the one or more block acknowledgement frames in a message distinct from the indication frame. As described above, the one or more block acknowledgment frames may indicate that the wireless communication device 102 has received a transmission. In some implementations, the base station 610a may send the indication frame via the link 114 (e.g., a power line link).

In some implementations, the indication frame may additionally or alternatively indicate the MCS. For example, the base station 610a may indicate to the assisting base station 110b what MCS the assisting base station 110b should use when transmitting data to the wireless communication device 102. For example, the indication frame may explicitly indicate a particular MCS. In another example, the indication frame may include one or more MPDU sequence numbers that may implicitly indicate a particular MCS. In some implementations, including the one or more MPDU sequence numbers in the indication frame may be one approach to indicating the data to be transmitted (e.g., the second portion of the data). In some configurations, the base station 610a may send the MCS in a message distinct from the indication frame. For example, the base station 610a may send one or more MPDU sequence numbers separate from the indication frame that indicate the MCS for the assisting base station 110b.

The base station 610a may transmit 814 a first portion of the data on a first set of spatial streams. For example, this may be done as described in connection with FIG. 4. In some implementations, one or more of the steps of the method 800 may be performed as part of an ongoing transmission. It should be noted that sending 808 the second portion, sending 810 a request, sending 812 the indication frame and transmitting 814 the first portion may be performed in any order.

Additionally or alternatively, one or more of sending 808 the second portion, sending 810 a request, sending 812 the indication frame and transmitting 814 the first portion may be performed concurrently.

Figure 9:
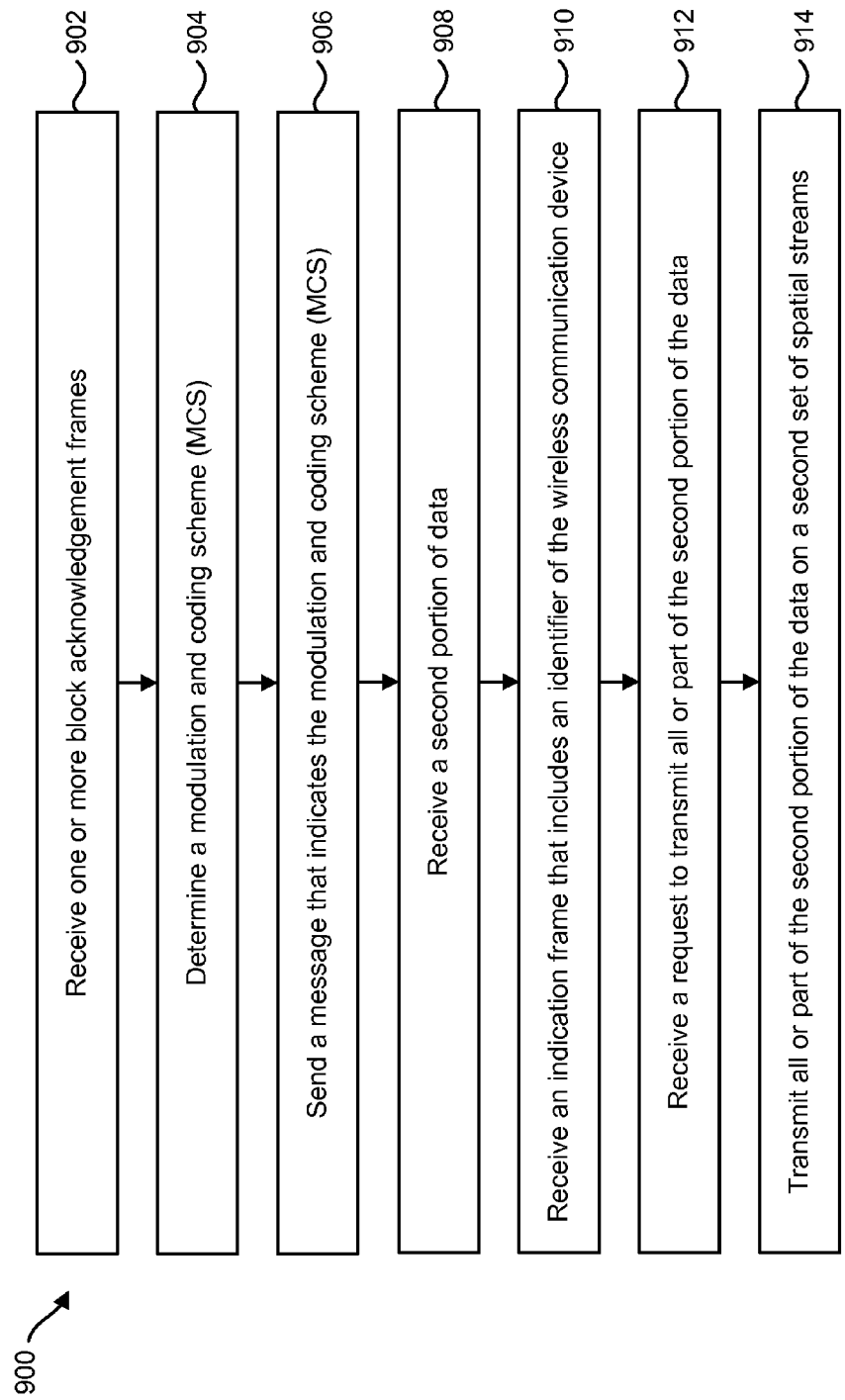
FIG. 9 is a flow diagram illustrating another more specific configuration of a method for applying multi-source MIMO communications.

FIG. 9 is a flow diagram illustrating another more specific configuration of a method 900 for applying multi-source MIMO communications. The method 900 may be performed by the assisting base station 710*b*. The assisting base station 710*b* may receive 902 one or more block acknowledgement frames. For example, the assisting base station 710*b* may receive 902 one or more block acknowledgement frames from the wireless communication device 102. Additionally or alternatively, the assisting base station 710*b* may receive 902 one or more block acknowledgement frames from the base station 110*a* that received the block acknowledgement frames from the wireless communication device 102.

The assisting base station 710*b* may determine 904 an MCS. As described above, the assisting base station 710*b* may determine 904 the MCS based on one or more of a received MCS (e.g., from the base station 110*a*) and/or one or more received block acknowledgement frames (e.g., from the wireless communication device 102 and/or from the base station 110*a*).

The assisting base station 710*b* may optionally send 906 a message that indicates the MCS. In configurations where the assisting base station 710*b* does not receive the MCS from the base station 110*a*, for example, the assisting base station 710*b* may send 906 a message to the base station 110*a* indicating what MCS the assisting base station 710*b* will be using, or anticipates using, for transmitting data to the wireless communication device 102.

The assisting base station 710*b* may receive 908 a second portion of data. In some implementations, this may be done as described in connection with FIG. 5.

The assisting base station 710*b* may receive 910 an indication frame that includes an identifier 214 of the wireless communication device 102. In some implementations, this may be done as described in connection with FIG. 5. For instance, the indication frame may include the identifier 214, an MCS, a transmission duration and/or a time to transmit data. It should be noted that in some configurations, determining 904 the MCS may be based on the received 910 indication frame.

The assisting base station 710*b* may receive 912 a request to transmit all or part of the second portion of the data. In some implementations, the assisting base station 710*b* may receive a message from the base station 110*a* that indicates a time to transmit the second portion of the data. In some implementations, the request may be included in the indication frame.

The assisting base station 710*b* may transmit 914 all or part of the second portion of the data on a second set of spatial streams. In some implementations, this may be done as described in connection with FIG. 5. In some implementations, one or more of the steps of the method 900 may be performed as part of an ongoing transmission. It should be noted that receiving 908 the second portion, receiving 910 the indication frame and receiving 912 a request may be performed in any order. Additionally or alternatively, one or more of receiving 908 the second portion, receiving 910 the indication frame and receiving 912 the request may be performed concurrently.

Figure 10:
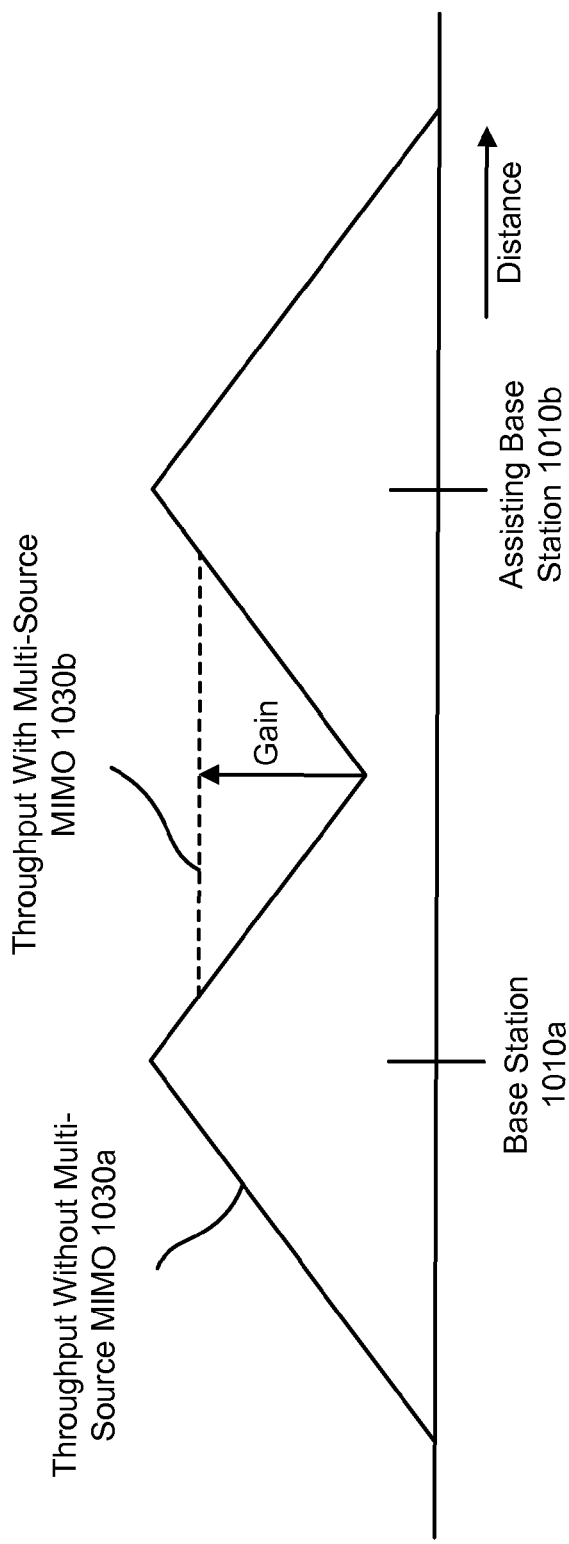
FIG. 10 is a diagram illustrating one example of potential throughput gain that may be achieved through the application of multi-source MIMO communications.

FIG. 10 is a diagram illustrating one example of potential throughput gain that may be achieved through the application of multi-source MIMO communications in accordance with the systems and methods disclosed herein. In particular, this example illustrates the base station 1010*a* (e.g., a first access point) and the assisting base station 1010*b* (e.g., a second access point) separated over a distance. A solid plot line illustrates a throughput 1030*a* that may be experienced by the wireless communication device 102 (e.g., a station) at different locations relative to the base station 1010*a* and the assisting base station 1010*b* when multi-source MIMO is not applied. As illustrated, the wireless communication device 102 throughput 1030*a* may dip when the wireless communication device 102 is located between the base station 1010*a* and the assisting base station 1010*b*. The application of multi-source MIMO communication as described herein may reduce the wireless communication device 102 throughput dip. A dashed plot line illustrates a throughput 1030*b* that may be experienced by the wireless communication device 102 (e.g., a station) at different locations relative to the base station 1010*a* and the assisting base station 1010*b* when multi-source MIMO is applied. Thus, a wireless communication device 102 between the base station 1010*a* and the assisting base station 1010*b* may experience a gain in throughput 1030 when multi-source MIMO is applied versus when it is not.

Figure 11:
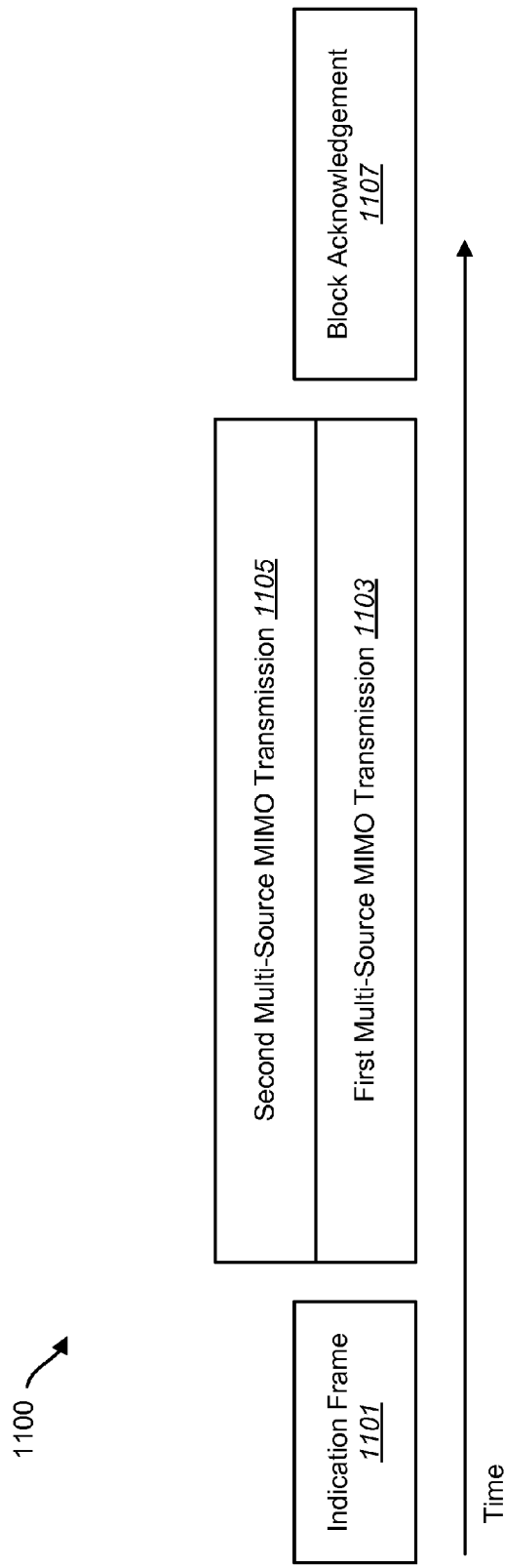
FIG. 11 is a diagram illustrating one example of communication timing in the context of MIMO communications.

FIG. 11 is a diagram illustrating one example of communication timing in the context of multi-source MIMO communications as disclosed herein. In particular, this example illustrates a frame exchange. More specifically, a frame exchange is illustrated in which an indication frame 1101 from a base station (e.g., the base station 110*a* or a first access point) starts a multi-source MIMO transmission. For instance, a base station (e.g., the base station 110*a*) sends an indication frame 1101 to another base station (e.g., the assisting base station 110*b* or a second access point). Then, the base stations concurrently transmit multi-source MIMO transmissions. For example, the base station 110*a* may transmit a first portion of the data in a first multi-source MIMO transmission 1103 and the assisting base station 1110*b* may transmit a second portion of the data in a second multi-source MIMO transmission 1105. The first multi-source MIMO transmission may be sent on a first set of spatial streams 106*a*, while the second multi-source MIMO transmission may be sent on a second set of spatial streams 106*b*.

As described above, the second portion of the data may be the same as or different from the first portion of the data. For example, a second portion of the data carried by a second multi-source MIMO transmission 1105 from the assisting base station 110*b* may include the first portion of the data carried by a first multi-source MIMO transmission 1103 from the base station 110*a*. Alternatively, the second portion of the data carried by the second multi-source MIMO transmission 1105 may be different from the first portion of the data carried by the first multi-source MIMO transmission 1103. Then, a block acknowledgement frame 1107 may be sent from the wireless communication device 102. The wireless communication device 102 may send the block acknowledgement frame 1107 to the base station 110*a* and/or the assisting base station 110*b*. In one example, the base station 110*a* and the assisting base station 110*b* may use the received block acknowledgement frame 1107 for their respective MCS selection algorithms. In this case, each base station 110 may "listen" to the same MAC address.

Figure 12:
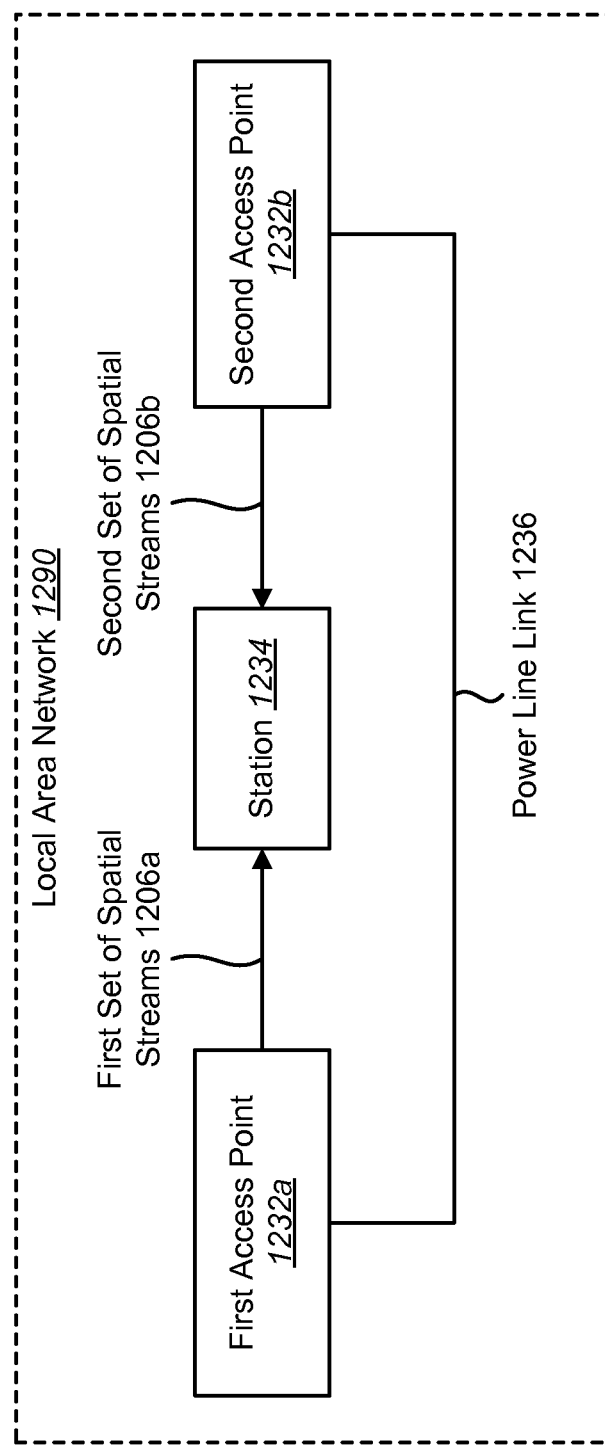
FIG. 12 is a diagram illustrating one example of access points and a station in which systems and methods for applying multi-source MIMO communications may be implemented.

FIG. 12 is a diagram illustrating a more specific example of access points 1232 and a station 1234 in which systems and methods for applying multi-source MIMO communications may be implemented. In particular, the elements illustrated in FIG. 12 are examples of corresponding elements illustrated in FIG. 1. Specifically, the access points 1232*a-b* are examples of the base stations 110*a-b*, the station 1234 is an example of the wireless communication device 102, the sets of spatial streams 1206a-b are examples of the sets of spatial streams 106a-b and the power line link 1236 is an example of the link 114.

In this example, a four-antenna station 1234 is located between the first access point 1232a and the second access point 1232b. The first access point 1232a sends a first portion of data on two spatial streams 1206a. Similarly, the second access point 1232b sends a second portion of data on two spatial streams 1206b. In this example, the access points 1232a-b and the station 1234 are included in a local area network 1290.

In this example, the access points 1232a-b are linked through the power line link 1236. For instance, the access points 1232a-b may send and/or receive data via power outlets that also provide power to the access points 1232a-b. In accordance with this example, the first access point 1232a may perform one or more of the methods 400 and 800 described in connection with FIGS. 4 and 8. Similarly, the second access point 1232b may perform one or more of the methods 500 and 900 described in connection FIGS. 5 and 9.

Figure 13:
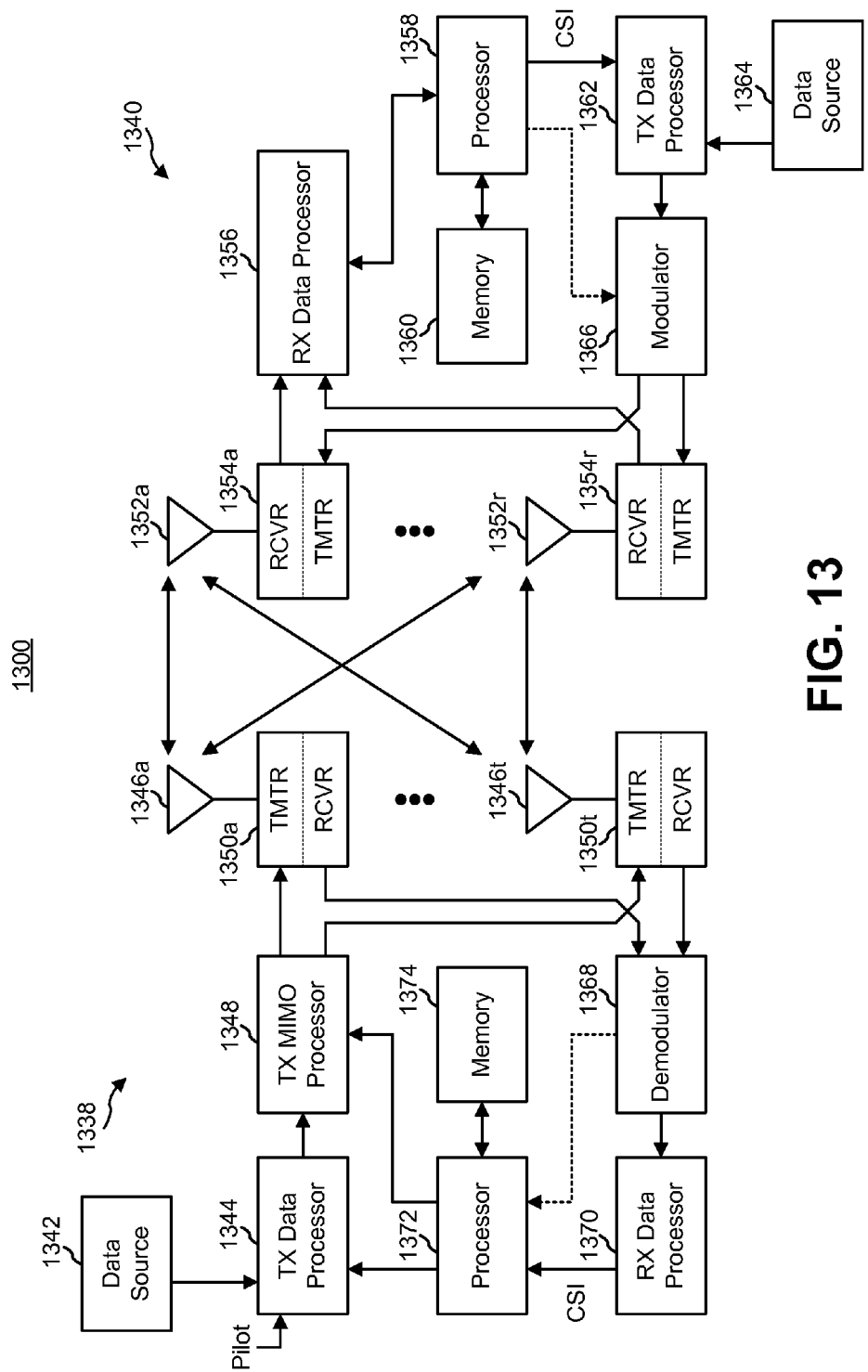
FIG. 13 is a block diagram of a transmitter and receiver in a MIMO system.

FIG. 13 is a block diagram of a transmitter 1338 and receiver 1340 in a MIMO system 1300. In some implementations, the transmitter 1338 may be implemented in one or more of the base stations 110a-b, 210a, 310b, 610a, 710b, 1010a-b and access points 1232a-b. In some implementations, the receiver 1340 may be implemented in one or more of the wireless communication devices 102 and station 1234. In the transmitter 1338, traffic data for a number of data streams is provided from a data source 1342 to a transmit (TX) data processor 1344. Each data stream may then be transmitted over a respective transmit antenna 1346a-t. The transmit (TX) data processor 1344 may format, code, and interleave the traffic data for each data stream based on a particular coding scheme selected for that data stream to provide coded data.

The coded data for each data stream may be multiplexed with pilot data (e.g., reference signals) using orthogonal frequency-division multiplexing (OFDM) techniques. The pilot data may be a known data pattern that is processed in a known manner and used at the receiver 1340 to estimate the channel response. The multiplexed pilot and coded data for each stream is then modulated (i.e., symbol mapped) based on a particular modulation scheme (e.g., binary phase shift keying (BPSK), quadrature phase shift keying (QPSK), multiple phase shift keying (M-PSK) or multi-level quadrature amplitude modulation (M-QAM)) selected for that data stream to provide modulation symbols. The data rate, coding and modulation for each data stream may be determined by instructions performed by a processor.

The modulation symbols for all data streams may be provided to a transmit (TX) multiple-input multiple-output (MIMO) processor 1348, which may further process the modulation symbols (e.g., for OFDM). The transmit (TX) multiple-input multiple-output (MIMO) processor 1348 then provides NT modulation symbol streams to NT transmitters (TMTR) 1350a through 1350t. The TX transmit (TX) multiple-input multiple-output (MIMO) processor 1348 may apply beamforming weights to the symbols of the data streams and to the antenna 1346 from which the symbol is being transmitted.

Each transmitter 1350 may receive and process a respective symbol stream to provide one or more analog signals, and further condition (e.g., amplify, filter, and upconvert) the analog signals to provide a modulated signal suitable for transmission over the MIMO channel. NT modulated signals from transmitters 1350a through 1350t are then transmitted from NT antennas 1346a through 1346t, respectively.

At the receiver 1340, the transmitted modulated signals are received by NR antennas 1352a through 1352r and the received signal from each antenna 1352 is provided to a respective receiver (RCVR) 1354a through 1354r. Each receiver 1354 may condition (e.g., filter, amplify, and downconvert) a respective received signal, digitize the conditioned signal to provide samples, and further process the samples to provide a corresponding "received" symbol stream.

An RX data processor 1356 then receives and processes the NR received symbol streams from NR receivers 1354 based on a particular receiver processing technique to provide NT "detected" symbol streams. The RX data processor 1356 then demodulates, deinterleaves and decodes each detected symbol stream to recover the traffic data for the data stream. The processing by RX data processor 1356 may be complementary to that performed by TX MIMO processor 1348 and TX data processor 1344 at transmitter system 1338.

A processor 1358 may periodically determine which pre-coding matrix to use. The processor 1358 may store information on and retrieve information from memory 1360. The processor 1358 formulates a reverse link message comprising a matrix index portion and a rank value portion. The reverse link message may be referred to as channel state information (CSI). The reverse link message may comprise various types of information regarding the communication link and/or the received data stream. The reverse link message is then processed by a TX data processor 1362, which also receives traffic data for a number of data streams from a data source 1364, modulated by a modulator 1366, conditioned by transmitters 1354a through 1354r, and transmitted back to the transmitter 1338.

At the transmitter 1338, the modulated signals from the receiver are received by antennas 1346, conditioned by receivers 1350, demodulated by a demodulator 1368 and processed by an RX data processor 1370 to extract the reverse link message transmitted by the receiver system 1340. A processor 1372 may receive channel state information (CSI) from the RX data processor 1370. The processor 1372 may store information on and retrieve information from memory 1374. The processor 1372 then determines which pre-coding matrix to use for determining the beamforming weights and then processes the extracted message.

Figure 14:
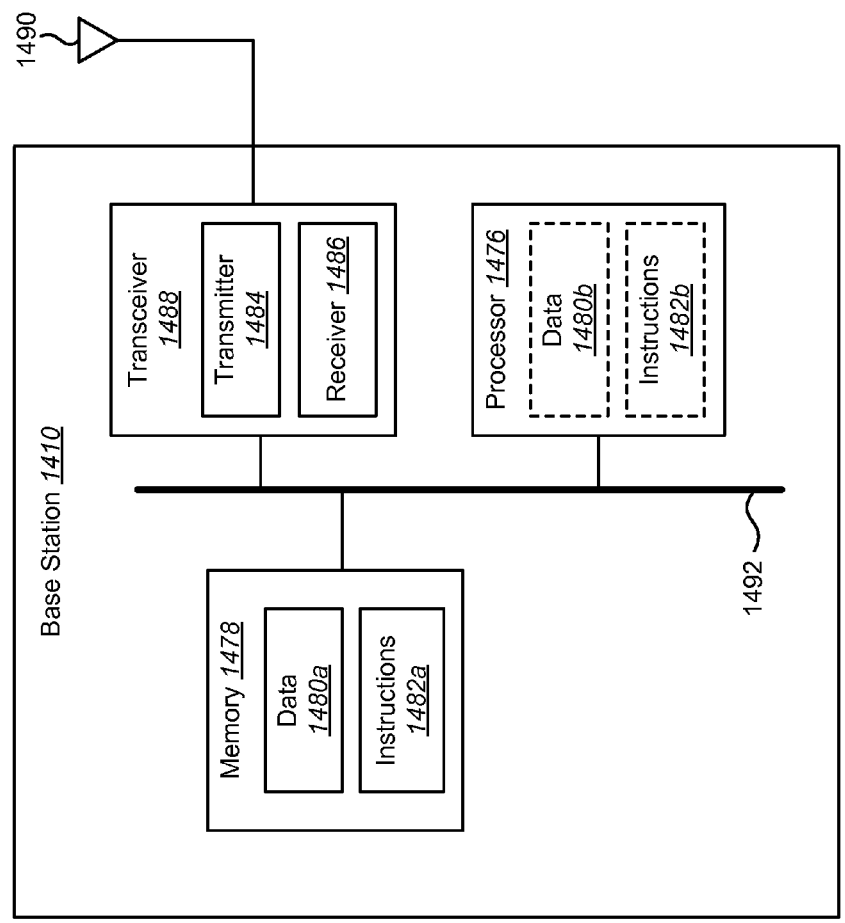
FIG. 14 illustrates certain components that may be included within a base station.

FIG. 14 illustrates certain components that may be included within a base station 1410. In some configurations, one or more of the base stations and access points described herein may be implemented in accordance with the base station 1410 illustrated in FIG. 14.

The base station 1410 includes a processor 1476. The processor 1476 may be a general purpose single- or multi-chip microprocessor (e.g., an ARM), a special purpose microprocessor (e.g., a digital signal processor (DSP)), a microcontroller, a programmable gate array, etc. The processor 1476 may be referred to as a central processing unit (CPU). Although just a single processor 1476 is shown in the base station 1410 of FIG. 14, in an alternative configuration, a combination of processors 1476 (e.g., an ARM and DSP) could be used.

The base station 1410 also includes memory 1478 in electronic communication with the processor 1476 (e.g., the processor 1476 can read information from and/or write information to the memory 1478). The memory 1478 may be any electronic component capable of storing electronic information. The memory 1478 may be random access memory (RAM), read-only memory (ROM), magnetic disk storage media, optical storage media, flash memory devices in RAM, on-board memory included with the processor 1476, programmable read-only memory (PROM), erasable programmable read-only memory (EPROM), electrically erasable PROM (EEPROM), registers, and so forth, including combinations thereof.

Data 1480a and instructions 1482a may be stored in the memory 1478. The instructions 1482a may include one or more programs, routines, sub-routines, functions, procedures, code, etc. The instructions 1482a may include a single computer-readable statement or many computer-readable statements. The instructions 1482a may be executable by the processor 1476 to implement one or more of the methods 400, 500, 800, 900 or functions described herein. Executing the instructions 1482a may involve the use of the data 1480a that is stored in the memory 1478. FIG. 14 shows some instructions 1482b and data 1480b being loaded into the processor 1476 (which may come from instructions 1482a and data 1480a in memory 1478).

The base station 1410 may also include a transmitter 1484 and a receiver 1486 to allow transmission and reception of signals between the base station 1410 and a remote location (e.g., another wireless communication device, etc.). The transmitter 1484 and receiver 1486 may be collectively referred to as a transceiver 1488. An antenna 1490 may be electrically coupled to the transceiver 1488. The base station 1410 may also include (not shown) multiple transmitters 1484, multiple receivers 1486, multiple transceivers 1488 and/or multiple antenna 1490.

The various components of the base station 1410 may be coupled together by one or more buses, which may include a power bus, a control signal bus, a status signal bus, a data bus, etc. For simplicity, the various buses are illustrated in FIG. 14 as a bus system 1492.

Figure 15:
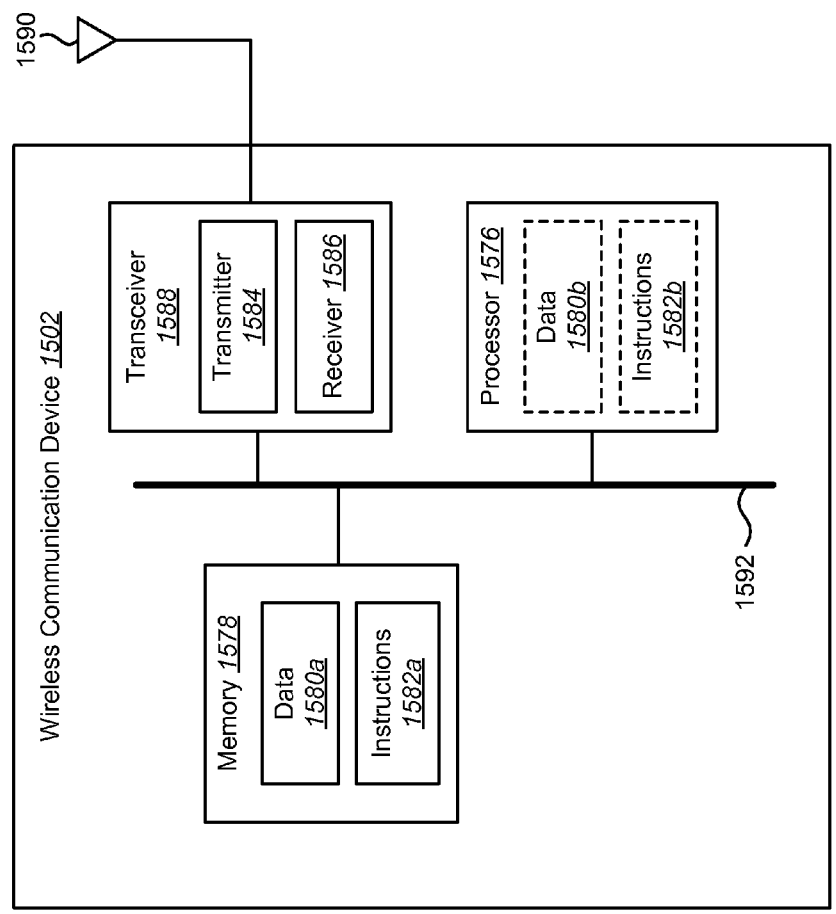
FIG. 15 illustrates certain components that may be included within a wireless communication device.

FIG. 15 illustrates certain components that may be included within a wireless communication device 1502. In some configurations, one or more of the wireless communication devices and station described herein may be implemented in accordance with the wireless communication device 1502 illustrated in FIG. 15.

The wireless communication device 1502 includes a processor 1576. The processor 1576 may be a general purpose single- or multi-chip microprocessor (e.g., an ARM), a special purpose microprocessor (e.g., a digital signal processor (DSP)), a microcontroller, a programmable gate array, etc. The processor 1576 may be referred to as a central processing unit (CPU). Although just a single processor 1576 is shown in the wireless communication device 1502 of FIG. 15, in an alternative configuration, a combination of processors 1576 (e.g., an ARM and DSP) could be used.

The wireless communication device 1502 also includes memory 1578 in electronic communication with the processor 1576 (e.g., the processor 1576 can read information from and/or write information to the memory 1578). The memory 1578 may be any electronic component capable of storing electronic information. The memory 1578 may be random access memory (RAM), read-only memory (ROM), magnetic disk storage media, optical storage media, flash memory devices in RAM, on-board memory included with the processor 1576, programmable read-only memory (PROM), erasable programmable read-only memory (EPROM), electrically erasable PROM (EEPROM), registers, and so forth, including combinations thereof.

Data 1580a and instructions 1582a may be stored in the memory 1578. The instructions 1582a may include one or more programs, routines, sub-routines, functions, procedures, code, etc. The instructions 1582a may include a single computer-readable statement or many computer-readable statements. The instructions 1582a may be executable by the processor 1576 to implement one or more of the methods or functions described herein. Executing the instructions 1582a may involve the use of the data 1580a that is stored in the memory 1578. FIG. 15 shows some instructions 1582b and data 1580b being loaded into the processor 1576 (which may come from instructions 1582a and data 1580a in memory 1578).

The wireless communication device 1502 may also include a transmitter 1584 and a receiver 1586 to allow transmission and reception of signals between the wireless communication device 1502 and a remote location (e.g., another wireless communication device, etc.). The transmitter 1584 and receiver 1586 may be collectively referred to as a transceiver 1588. An antenna 1590 may be electrically coupled to the transceiver 1588. The wireless communication device 1502 may also include (not shown) multiple transmitters 1584, multiple receivers 1586, multiple transceivers 1588 and/or multiple antenna 1590.

The various components of the wireless communication device 1502 may be coupled together by one or more buses, which may include a power bus, a control signal bus, a status signal bus, a data bus, etc. For simplicity, the various buses are illustrated in FIG. 15 as a bus system 1592.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "couple" and any variations thereof may indicate a direct or indirect connection between elements. For example, a first element coupled to a second element may be directly connected to the second element, or indirectly connected to the second element through another element.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, include compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for applying multi-source multiple-input multiple-output communications by a base station, comprising:
    determining, at the base station, a modulation and coding scheme for an assisting base station based on received block acknowledgment frames;
    obtaining data to send to a wireless communication device;
    sending a second portion of the data to the assisting base station;
    sending an indication frame that includes an identifier of the wireless communication device to the assisting base station;
    sending information indicating the determined modulation and coding scheme to the assisting base station; and
    sending a first portion of the data on a first set of spatial streams.

2. The method of claim 1, wherein the indication frame comprises an identifier of data to be sent.

3. The method of claim 1, wherein the indication frame specifies a duration of a pending multi-source multiple-input multiple-output communication.

4. The method of claim 1, wherein the second portion of the data and the indication frame are sent to the assisting base station via a wired link.

5. The method of claim 1, wherein the second portion of the data and the indication frame are sent to the assisting base station via power line link.

6. The method of claim 1, further comprising sending a request to send all or part of the second portion of the data.

7. The method of claim 1, wherein the indication frame is selected from a group consisting of a unicast frame and a broadcast frame.

8. The method of claim 1, wherein the second portion of data is sent by the assisting base station over a second set of spatial streams.

9. The method of claim 8, wherein the first portion of data and the second portion of data include the same data.

10. The method of claim 8, wherein the first portion of data and the second portion of data include different data.

11. The method of claim 1, wherein the first portion of data is part of a multi-source multiple-input multiple-output communication.

12. The method of claim 1, wherein the modulation and coding scheme for the assisting base station is different than a modulation and coding scheme used for the first set of spatial streams.

13. The method of claim 1, wherein the received block acknowledgment frames have sequence numbers corresponding to media access control protocol data units sent by the assisting base station.

14. The method of claim 1, wherein determining the modulation and coding scheme for the assisting base station is further based on an anticipated modulation and coding scheme received from the assisting base station.

15. The method of claim 1, wherein the second portion of data comprises prepared media access protocol data units that include media access control headers and encryption.

16. A method for applying multi-source multiple-input multiple-output communications by an assisting base station, comprising:
    determining, at the assisting base station, a modulation and coding scheme based on received block acknowledgment frames;
    receiving a second portion of data that is part of a multi-source multiple-input multiple-output communication;
    receiving an indication frame that comprises an identifier of a wireless communication device; and
    sending all or part of the second portion of the data on a second set of spatial streams.

17. The method of claim 16, wherein the indication frame comprises an identifier of data to be sent.

18. The method of claim 16, wherein the indication frame specifies a duration of a pending multi-source multiple-input multiple-output communication.

19. The method of claim 16, wherein the second portion of the data and the indication frame are received via a wired link.

20. The method of claim 16, wherein the second portion of the data and the indication frame are received via power line link.

21. The method of claim 16, further comprising receiving a request to send all or part of the second portion of the data.

22. A base station for applying multi-source multiple-input multiple-output communications, comprising:
    multi-source multiple-input multiple-output communication circuitry that determines, at the base station, a modulation and coding scheme for an assisting base station based on received block acknowledgment frames, obtains data to send to a wireless communication device, sends a second portion of the data to the assisting base station, sends an indication frame that comprises an identifier of the wireless communication device to the assisting base station, sends information indicating the determined modulation and coding scheme to the assisting base station, and sends a first portion of the data on a first set of spatial streams.

23. The base station of claim 22, wherein the indication frame comprises an identifier of data to be sent.

24. The base station of claim 22, wherein the indication frame specifies a duration of a pending multi-source multiple-input multiple-output communication.

25. The base station of claim 22, wherein the second portion of the data and the indication frame are sent to the assisting base station via a wired link.

26. The base station of claim 22, wherein the second portion of the data and the indication frame are sent to the assisting base station via power line link.

27. The base station of claim 22, wherein the multi-source multiple-input multiple-output communication circuitry sends a request to send all or part of the second portion of the data.

28. The base station of claim 22, wherein the indication frame is selected from a group consisting of a unicast frame and a broadcast frame.

29. An assisting base station for applying multi-source multiple-input multiple-output communications, comprising:
 multi-source multiple-input multiple-output communication circuitry that determines, at the assisting base station, a modulation and coding scheme based on received block acknowledgment frames, receives a second portion of data that is part of a multi-source multiple-input multiple-output communication, receives an indication frame that comprises an identifier of a wireless communication device, and sends all or part of the second portion of the data on a second set of spatial streams.

30. The assisting base station of claim 29, wherein the indication frame comprises an identifier of data to be sent.

31. The assisting base station of claim 29, wherein the indication frame specifies a duration of a pending multi-source multiple-input multiple-output communication.

32. The assisting base station of claim 29, wherein the at least a portion of the data and the indication frame are received via a wired link.

33. The assisting base station of claim 29, wherein the second portion of the data and the indication frame are received via power line link.

34. The assisting base station of claim 29, wherein the multi-source multiple-input multiple-output communication circuitry receives a request to send all or part of the second portion of the data.

35. A computer-program product for applying multi-source multiple-input multiple-output communications, comprising a non-transitory tangible computer-readable medium having instructions thereon, the instructions comprising:
 code for causing a base station to obtain data to send to a wireless communication device;
 code for causing the base station to send a second portion of the data to the assisting base station;
 code for causing the base station to send an indication frame that comprises an identifier of the wireless communication device to the assisting base station, wherein the indication frame comprises an identifier of data to be sent, a duration of a pending multi-source multiple-input multiple-output communication, and a time to transmit the data to be sent; and
 code for causing the base station to send a first portion of the data on a first set of spatial streams.

36. The computer-program product of claim 35, wherein the instructions further comprise code for causing the base station to send a request to send all or part of the second portion of the data.

37. The computer-program product of claim 35, wherein the indication frame is selected from a group consisting of a unicast frame and a broadcast frame.

38. A computer-program product for applying multi-source multiple-input multiple-output communications at an assisting access point that operates in accordance with Wireless Fidelity standards, comprising a non-transitory tangible computer-readable medium having instructions thereon, the instructions comprising:
 code for causing the assisting access point to receive a second portion of data that is part of a multi-source multiple-input multiple-output communication;
 code for causing the assisting access point to receive an indication frame that comprises an identifier of a wireless communication device; and
 code for causing the assisting access point to send all or part of the second portion of the data on a second set of spatial streams.

39. The computer-program product of claim 38, wherein the indication frame specifies a duration of a pending multi-source multiple-input multiple-output communication.

40. The computer-program product of claim 38, wherein the instructions further comprise code for causing the assisting access point to receive a request to send all or part of the second portion of the data.

41. An apparatus for applying multi-source multiple-input multiple-output communications, comprising:
 means for determining, at a base station, a modulation and coding scheme for an assisting base station based on received block acknowledgment frames;
 means for obtaining data to send to a wireless communication device;
 means for sending a second portion of the data to the assisting base station;
 means for sending an indication frame that comprises an identifier of the wireless communication device to the assisting base station;
 means for sending information indicating the determined modulation and coding scheme to the assisting base station; and
 means for sending a first portion of the data on a first set of spatial streams.

42. The apparatus of claim 41, wherein the indication frame specifies a duration of a pending multi-source multiple-input multiple-output communication.

43. The apparatus of claim 41, further comprising means for sending a request to send all or part of the second portion of the data.

44. The apparatus of claim 41, wherein the indication frame is selected from a group consisting of a unicast frame and a broadcast frame.

45. An apparatus for applying multi-source multiple-input multiple-output communications, comprising:
 means for determining, at an assisting base station, a modulation and coding scheme based on received block acknowledgment frames;
 means for receiving a second portion of data that is part of a multi-source multiple-input multiple-output communication;
 means for receiving an indication frame that comprises an identifier of the wireless communication device; and
 means for sending all or part of the second portion of the data on a second set of spatial streams.

46. The apparatus of claim 45, wherein the indication frame specifies a duration of a pending multi-source multiple-input multiple-output communication.

47. The apparatus of claim 45, further comprising means for receiving a request to send all or part of the second portion of the data.

* * * * *